United States Patent
Ishibashi

(10) Patent No.: US 9,134,515 B2
(45) Date of Patent: Sep. 15, 2015

(54) OPTICAL SYSTEM AND OPTICAL APPARATUS

(75) Inventor: Tomohiko Ishibashi, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 415 days.

(21) Appl. No.: 13/028,399

(22) Filed: Feb. 16, 2011

(65) Prior Publication Data

US 2011/0199689 A1 Aug. 18, 2011

(30) Foreign Application Priority Data

Feb. 16, 2010 (JP) .................................. 2010-031477
Feb. 1, 2011 (JP) .................................. 2011-019771

(51) Int. Cl.
*G02B 15/16* (2006.01)
*G02B 15/173* (2006.01)
*G02B 15/22* (2006.01)

(52) U.S. Cl.
CPC .............. *G02B 15/173* (2013.01); *G02B 15/16* (2013.01); *G02B 15/22* (2013.01)

(58) Field of Classification Search
CPC ........ G02B 15/26; G02B 15/28; G02B 15/24; G02B 15/22
USPC .................... 359/690, 692, 693, 688
See application file for complete search history.

(56) References Cited

U.S. PATENT DOCUMENTS

| | | | | |
|---|---|---|---|---|
| 5,539,581 | A | * | 7/1996 | Sato ............................... 359/691 |
| 5,717,527 | A | * | 2/1998 | Shibayama ................... 359/690 |
| 5,995,299 | A | * | 11/1999 | Yoon .............................. 359/692 |
| 6,282,032 | B1 | | 8/2001 | Tomita |
| 7,417,802 | B2 | * | 8/2008 | Horiuchi ...................... 359/687 |
| 2007/0273980 | A1 | | 11/2007 | Horiuchi |

FOREIGN PATENT DOCUMENTS

| | | |
|---|---|---|
| JP | 07301749 A | 11/1995 |
| JP | 2000089109 A | 3/2000 |
| JP | 2000121939 A | 4/2000 |
| JP | 2002090622 A | 3/2002 |
| JP | 2003-329924 A | 11/2003 |

(Continued)

OTHER PUBLICATIONS

Hoya Corp. "FD60." Hoya Optical Glass. N.p., n.d. Web. Feb. 19, 2013. <http://www.hoya-opticalworld.com/common/pdf/FD60.pdf>.*
OHARA:English. OHARA:English. N.p., n.d. Web. Jun. 20, 2013. <http://www.ohara-inc.co.jp/en/.*
HOYA Products. HOYA Optical Glass. N.p., n.d. Web. Apr. 22, 2014. <http://www.hoya-opticalworld.com/japanese/products/all_products.html>.*

(Continued)

*Primary Examiner* — Zachary Wilkes
(74) *Attorney, Agent, or Firm* — Rossi, Kimms & McDowell LLP

(57) ABSTRACT

The optical system includes first (positive) and second (negative) lens units arranged in order from an object side to an image side, and an aperture stop disposed further on the image side than the second lens unit. The first lens unit includes at least one first optical element satisfying $\phi GH>0.0$, $vdGH<39.5$ and $ndGH>1.70$. The optical system satisfies $0.65<|\phi2/\phi1|<6.00$ and $0.45<|\Sigma\phi GH\times\phi2/\phi1^2|<4.00$. $\phi GH$ represents a refractive power of the first optical element when light-entrance and light-exit surfaces thereof are in contact with air, $vdGH$ and $ndGH$ respectively represent an Abbe number and a refractive index of a material forming the first optical element for a d-line, $\phi1$ and $\phi2$ respectively represent the refractive powers of the first lens unit and the second lens unit, and $\Sigma\phi GH$ represents a sum total of the refractive power $\phi GH$ of the at least one first optical element.

11 Claims, 23 Drawing Sheets

(56) References Cited

FOREIGN PATENT DOCUMENTS

| JP | 2007316288 A | 12/2007 |
| JP | 2009-015026 A | 1/2009 |
| JP | 2010-181634 A | 8/2010 |

OTHER PUBLICATIONS

Hecht, Eugene. Optics. Reading, MA: Addison-Wesley, 1998. p. 164. Print.*
Official Action issued in JP2011-019771 mailed Sep. 2, 2014.

* cited by examiner

OPTICAL SYSTEM AND OPTICAL APPARATUS

BACKGROUND OF THE INVENTION

1. Field of the Invention

The present invention relates to an optical system including two or more lens units, which is suitable for, for example, image pickup.

2. Description of the Related Art

Various aberrations such as chromatic aberration which vary with focusing are often corrected by using extraordinary dispersion materials. In particular, macro lenses whose maximum image-forming magnification is large and aberration variation with focusing is significant are formed by using extraordinary dispersion materials having a low dispersion to suppress the variation of the chromatic aberration. Moreover, it is also possible to suppress such variation of the chromatic aberration by using high dispersion resin materials having extraordinary dispersion characteristics.

For example, Japanese Patent Laid-Open No. 2003-329924 discloses a macro lens that suppresses variation of various aberrations with focusing by using a low dispersion material. Moreover, Japanese Patent Laid-Open No. 2009-15026 discloses a macro lens that suppresses variation of various aberrations with focusing by using a high dispersion resin material having extraordinary dispersion characteristics.

However, the low dispersion material and the high dispersion resin material having the extraordinary dispersion characteristics used for the macro lenses disclosed in Japanese Patent Laid-Open Nos. 2003-329924 and 2009-15026 generally have a low refractive index, which makes it difficult to suppress variation of spherical aberration with the focusing. On the other hand, providing a large refractive index to a low dispersion material in order to correct the chromatic aberration may increase a volume and a weight of the material.

In addition, such high dispersion resin materials generally have characteristics that are easily changed with temperature, humidity and ultraviolet, which causes concern about environment resistance.

SUMMARY OF THE INVENTION

The present invention provides an optical system capable of well correcting various aberrations which vary with movement of a lens unit for zooming or focusing, and has an excellent environment resistance.

The present invention provides as one aspect thereof an optical system including a first lens unit and a second lens unit that are arranged in order from an object side to an image side such that a distance therebetween in an optical axis direction is changed with at least one of zooming and focusing, the first lens unit having a positive refractive power and the second lens unit having a negative refractive power, and an aperture stop disposed further on the image side than the second lens unit. The first lens unit includes at least one first optical element satisfying the following conditions:

$\phi GH > 0.0$ $\nu dGH < 39.5$ $ndGH > 1.70$.

Furthermore, the optical system satisfies the following conditions:

$0.65 < |\phi 2/\phi 1| < 6.00$ $0.45 < |\Sigma \phi GH \times \phi 2/\phi 1^2| < 4.00$ where $\phi GH$ represents a refractive power of the first optical element when a light-entrance surface and a light-exit surface of the first optical element are in contact with air, $\nu dGH$ and $ndGH$ respectively represent an Abbe number and a refractive index of a material forming the first optical element for a d-line, $\phi 1$ and $\phi 2$ respectively represent the refractive powers of the first lens unit and the second lens unit, and $\Sigma \phi GH$ represents a sum total of the refractive power $\phi GH$ of the at least one first optical element.

The present invention provides as another aspect thereof an optical apparatus including the above-described optical system.

Further features of the present invention will become apparent from the following description of exemplary embodiments with reference to the attached drawings.

DESCRIPTION OF THE PREFERRED EMBODIMENTS

Figure 1:
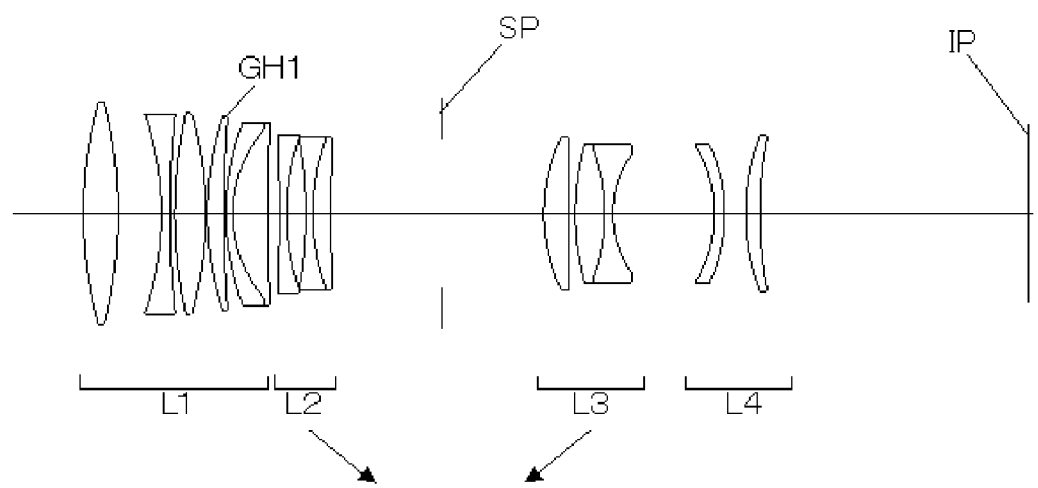
FIG. 1 is a cross-sectional view showing an optical system of Embodiment 1 of the present invention.

Exemplary embodiments of the present invention will hereinafter be described with reference to the accompanying drawings.

Description will be first made of common matters to embodiments described below. An optical system of each of the embodiments is constituted by at least two lens units that include a first lens unit having a positive refractive power and a second lens unit having a negative refractive power, the first and second lens units being arranged in order from an object side to an image side. The term "first and second lens units" means two lens groups whose distance between them in a direction of an optical axis (hereinafter also referred to as an "optical axis direction") is changed during at least one of zooming and focusing. The term "lens unit" may be used for a lens group that is shifted in a direction orthogonal to the optical axis for optical image stabilization (optical image shake correction).

Moreover, the optical system of each embodiment includes an aperture stop that is disposed further on the image side than the second lens unit.

An image-forming magnification β of the optical system of each embodiment is expressed by the following expression where y represents a height of an object from the optical axis, and y' represents a height of an image of the object formed by the optical system from the optical axis:

$$\beta = |y'/y|.$$

In optical systems capable of forming images of an infinite distance object to a close distance object, various aberrations are varied with focusing, and Variation amounts of the various aberrations increase as a maximum image-forming magnification of the optical system increases. In particular, in macro lenses having a higher optical performance for the close distance object than general optical systems, insufficient correction of spherical aberration and variation of chromatic aberration with focusing are easily caused.

When moving the lens unit widely during focusing, reducing load for driving the lens unit (hereinafter referred to as "lens driving load") enables high-speed focusing. Methods for performing focusing by driving the lens unit includes one which moves the entire optical system or a most-object side front lens unit of the optical system to the object side. However, such a focusing method increases the lens driving load, which easily makes it difficult to perform the high-speed focusing. In addition, moving the optical system to the object side easily causes a problem such as interference between the most-object side front lens unit and the close distance object.

On the other hand, there is a case of employing an inner focus method which performs focusing without moving either of the entire optical system and the front lens unit. The inner focus method moving a lens unit other than the front lens unit for the focusing enables reduction of the lens driving load.

When it is difficult to come close to the close distance object in image pickup thereof, it is desirable that a distance from the object to the front lens unit, that is, a working distance be long. A middle telephoto macro lens or a telephoto macro lens whose focal length is relatively long can ensure a somewhat long working distance.

Moreover, in order to ensure a relatively long working distance without changing the entire length of the optical system during the focusing, there is a case of employing an optical system that includes a positive lens unit disposed further on an object side (closer to an object) than an aperture stop and having a positive refractive power, and a negative lens unit disposed further on an image side (closer to an image plane) than the positive lens unit and having a negative refractive power. In such an optical system, for focusing from the infinite distance object to the close distance object, the negative lens unit is moved to the image side along the optical axis. Furthermore employing a floating lens structure in which a positive lens unit disposed further on the image side than the negative lens unit is moved to the object side along the optical axis enables better correction of the variation of the various aberrations.

In optical systems in which a positive lens unit, a negative lens unit and an aperture stop are arranged in order from an object side to an image side, a material forming each of the lens units is selected such that variation of chromatic aberration with zooming is corrected. In particular, it is necessary that the chromatic aberration generated in the positive lens unit disposed closest to the object when focusing is made on a close distance object be corrected, and therefore, in general, the positive lens unit is constituted by a low dispersion convex lens and a high dispersion concave lens.

Moreover, in optical systems including a positive lens unit disposed further on the object side than an aperture stop, in order to correct chromatic aberration, a convex lens constituting a part of the positive lens unit is generally formed of a low dispersion material and a concave lens constituting another part of the positive lens unit is generally formed of a higher dispersion material than the low dispersion material. This configuration makes it easy to cause the lens unit to correct the chromatic aberration, which enables a macro lens or the like to suppress various aberrations with focusing, in particular the chromatic aberration.

On the other hand, in optical systems including a negative lens unit disposed further on the object side than an aperture stop, a convex lens constituting a part of the negative lens unit is generally formed of a high dispersion material and a concave lens constituting another part of the negative lens unit is generally formed of a lower dispersion material than the high dispersion material. This configuration also makes it easy to correct the chromatic aberration generated in the lens unit.

In general optical materials, high dispersion materials tend to show more significant changes of their refractive indices on a short wavelength side than low dispersion materials. For example, the high dispersion materials generally have a larger partial dispersion ratio θgF for a g-line and an F-line than that of the low dispersion materials. The convex lens that is included in the positive lens unit disposed further on the object side than the aperture stop and that is formed of a relatively low dispersion material easily causes insufficient correction of spherical aberration in image pickup of a close distance object. Moreover, in the image pickup of the close distance object, chromatic aberration such as longitudinal chromatic aberration and chromatic aberration of magnification is also easily varied, and spherical aberration on the short wavelength side is over generated, which easily causes chromatic spherical aberration.

The optical system of each embodiment includes, as described above, in order from the object side to the image side, the first lens unit having the positive refractive power, the second lens unit having the negative refractive power and the aperture stop disposed further on the image side than the second lens unit. Moreover, each embodiment provides, to the first lens unit disposed further on the object side than the aperture stop, at least one first optical element GH formed of a relatively high dispersion material so as to correct variation of various aberrations well. Such a configuration makes it possible to cause the macro lens capable of forming an image of the close distance object to correct the variation of the various aberrations, in particular with focusing well.

The first optical element GH satisfies the following conditions (1) to (3):

$$\phi GH > 0.0 \tag{1}$$

$$\nu dGH < 39.5 \tag{2}$$

$$ndGH > 1.70 \tag{3}$$

where $\phi GH$ represents a refractive power of the first optical element when a light-entrance surface and a light-exit surface of the first optical element GH are in contact with air, and $\nu dGH$ and $ndGH$ respectively represent an Abbe number (Abbe constant) and a refractive index of a material forming the first optical element GH for a d-line. The refractive power of an optical element or a lens unit corresponds to an inverse of a focal length thereof.

Moreover, the optical system of each embodiment satisfies the following condition (4):

$$0.65 < |\phi 2/\phi 1| < 6.0 \tag{4}$$

where $\phi 1$ and $\phi 2$ respectively represent the refractive powers of the first lens unit and the second lens unit.

In addition, the optical system of each embodiment satisfies the following condition (5):

$$0.45 < |\Sigma \phi GH \times \phi 2/\phi 1^2| < 4.00 \tag{5}$$

where $\Sigma \phi GH$ represents a sum total of the refractive power $\phi GH$ of the at least one first optical element GH.

The first optical element GH formed by a high dispersion material satisfying the conditions (1) and (2) provides a light collecting effect, which enables correction of chromatic aberration (longitudinal chromatic aberration and chromatic aberration of magnification) and chromatic spherical aberration. In particular, the first optical element GH enables correction of the chromatic aberration and the chromatic spherical aberration that are varied with the focusing. Not satisfying the condition (2) causes insufficient correction of the chromatic aberration.

The first optical element GH satisfying the condition (3) enables suppression of the variation of the chromatic aberration with the focusing, which makes it possible to correct the spherical aberration and the chromatic spherical aberration well. Not satisfying the condition (3) causes insufficient correction of the variation of the chromatic aberration and insufficient correction of the spherical aberration and the chromatic spherical aberration, which increases variation of the spherical aberration.

The optical system whose refractive power arrangement satisfies the condition (4) can correct the various aberrations and the chromatic aberration. In particular, the optical system enables correction of the chromatic aberration and the chromatic spherical aberration that are varied with the focusing. Not satisfying the condition (4) makes it impossible to provide the effects that can be provided by satisfying the conditions (1) to (3) because of a relationship between the refractive power and the chromatic aberration in each lens unit.

If the maximum image-forming magnification max of the optical system of each embodiment is larger than 0.5, in order to suppress the variation of the various aberrations with the focusing, it is desirable to satisfy the following condition (4-1) in addition to the condition (4):

$$0.65 < |\phi 2/\phi 1| < 2.0 \tag{4-1}$$

It is more desirable to satisfy the following condition (4-2):

$$0.68 < |\phi 2/\phi 1| < 1.8 \tag{4-2}$$

The condition (5) shows a color correcting effect of the first optical element GH, and a value of $|\Sigma \phi GH \times \phi 2/\phi 1^2|$ lower than the lower limit of the condition (5) causes insufficient chromatic aberration correction. A value of $\Sigma |\phi GH \times \phi 2/\phi 1^2|$ higher than the upper limit of the condition (5) causes excessive chromatic aberration correction, which makes correction of a first-order chromatic aberration difficult.

In order to suppress the variation of the various aberrations, in particular the chromatic aberration with the focusing, it is desirable to satisfy the following condition (5-1) in addition to the condition (5):

$$0.50 < |\Sigma \phi GH \times \phi 2/\phi 1^2| < 3.00 \tag{5-1}$$

It is more desirable to satisfy the following condition (5-2):

$$0.55 < |\Sigma \phi GH \times \phi 2/\phi 1^2| < 2.00 \tag{5-2}$$

It is still more desirable to satisfy the following condition (5-3):

$$0.55 < |\Sigma \phi GH \times \phi 2/\phi 1^2| < 1.50 \tag{5-3}$$

It is further more desirable that the sum total $\Sigma \phi GH$ of the refractive power $\phi GH$ of the at least one first optical element GH included in the first lens unit and satisfying the conditions (1) to (3) and the positive refractive power $\phi 1$ of the first lens unit satisfy the following condition (6). The satisfaction of the condition (6) more certainly enables achievement of the above-described effects.

$$0.15 < \Sigma \phi GH/\phi 1 < 3.0 \tag{6}$$

A value of $\Sigma \phi GH/\phi 1$ lower than the lower limit of the condition (5) causes insufficient correction of the chromatic aberration, the spherical aberration and the like, which makes it difficult to sufficiently provide the above-described effects. A value of $\Sigma \phi GH/\phi 1$ higher than the upper limit of the condition (5) causes excessive correction of the chromatic aberration, the spherical aberration and the like, which may increase the various aberrations.

In order to correct the chromatic aberration, the spherical aberration and the like, it is desirable to satisfy the following condition (6-1) in addition to the condition (6):

$$0.155 < \Sigma \phi GH/\phi 1 < 2.50 \tag{6-1}$$

It is more desirable to satisfy the following condition (6-2):

$$0.160 < \Sigma \phi GH/\phi 1 < 2.00 \tag{6-2}$$

It is still more desirable to satisfy the following condition (6-3):

$$0.162 < \Sigma \phi GH/\phi 1 < 1.50 \tag{6-3}$$

It is further more desirable to satisfy the following condition (6-4):

$$0.164 < \Sigma \phi GH/\phi 1 < 1.25 \tag{6-4}$$

It is yet still more desirable that the sum total $\Sigma \phi GH$ of the refractive power $\phi GH$ of the at least one first optical element GH included in the first lens unit and satisfying the conditions (1) to (3), the positive refractive power $\phi 1$ of the first lens unit and the maximum image-forming magnification $\beta$max of the optical system satisfy the following condition (7):

$$0.28 < |\Sigma \phi GH/\phi 1/\beta max| < 3.0 \tag{7}$$

A value of $|\Sigma \phi GH/\phi 1/\beta max|$ lower than the lower limit of the condition (7) causes insufficient correction of the chromatic aberration and the spherical aberration, which makes it difficult to sufficiently provide the above-described effects. A value of $|\Sigma \phi GH/\phi 1/\beta max|$ higher than the upper limit of the condition (7) causes excessive correction of the chromatic aberration and the spherical aberration, which makes it difficult to suppress the variation of the various aberrations with the focusing.

In order to more effectively suppress the variation of the various aberrations with the focusing, it is desirable to satisfy the following condition (7-1) in addition to the condition (7):

$$0.32<|\Sigma\phi GH/\phi 1/\beta max|<2.5 \quad (7\text{-}1).$$

It is more desirable to satisfy the following condition (7-2):

$$0.36<|\Sigma\phi GH/\phi 1/\beta max|<2.0 \quad (7\text{-}2).$$

It is still more desirable to satisfy the following condition (7-3):

$$0.38<|\Sigma\phi GH/\phi 1/\beta max|<1.6 \quad (7\text{-}3).$$

Moreover, it is further more desirable to satisfy the following condition (8) where $\Sigma\phi GN$ represents a sum total of a refractive power $\Sigma\phi GN$ of at least one negative optical element GN included in the first lens unit. The satisfaction of the condition (8) makes it possible to more certainly provide the above-described effects.

$$0.75<\Sigma\phi GN/\phi 1|<4.00 \quad (8).$$

When considering achromatizing in the first lens unit that includes the first optical element GH satisfying the condition (2), a concave lens formed of a relatively high dispersion material generally tends to have a high refractive power. This means that the negative optical element GN satisfies the condition (8) so as to correct the chromatic aberration generated in the first optical element GH. A value of $|\Sigma\phi GN/\phi 1|$ lower than the lower limit of the condition (8) makes sufficient chromatic aberration correction difficult. From an aberration correction viewpoint, it is desirable that the numerical range of the condition (8) be changed to the following range:

$$0.76<|\Sigma\phi GN/\phi 1|<3.6 \quad (8\text{-}1).$$

It is more desirable to satisfy the following condition (8-2):

$$0.77<|\Sigma\phi GN/\phi 1|<3.2 \quad (8\text{-}2).$$

Moreover, it is more preferable to satisfy the following condition (9) where $\phi\Sigma GL$ represents a sum total of a refractive power $\phi GL$ of at least one optical element formed of a material whose Abbe number $\upsilon d$ for the d-line is larger than 70.5 among at least one positive optical element included in the first lens unit and having a positive refractive power. The satisfaction of the condition (9) makes it possible to more certainly provide the above-described effects.

$$0.15<(\Sigma\phi GL+\Sigma\phi GH)/\phi 1<2.5 \quad (9)$$

A value of $(\Sigma\phi GL+\Sigma\phi GH)/\phi 1$ lower than the lower limit of the condition (9) causes insufficient chromatic aberration correction, which may make it difficult to provide the above-described effects.

It is desirable to satisfy the following condition (9-1) in addition to the condition (9) in order to suppress the variation of the various aberrations with the focusing:

$$0.155<(\Sigma\phi GL+\Sigma\phi GH)/\phi 1<2.0 \quad (9\text{-}1).$$

It is more desirable to satisfy the following condition (9-2):

$$0.16<(\Sigma\phi GL+\Sigma\phi GH)/\phi 1<1.75 \quad (9\text{-}2).$$

It is still more desirable to satisfy the following condition (9-3):

$$0.165<(\Sigma\phi GL+\Sigma\phi GH)/\phi 1<1.55 \quad (9\text{-}3).$$

In addition, it is desirable to satisfy the following condition (10) where $\theta gFGH$ represents a partial dispersion ratio of the material forming the first optical element GH and satisfying the conditions (1) to (3) for the g- and F-lines:

$$0.58<\theta gFGH<0.90 \quad (10).$$

A value of $\theta gFGH$ lower than the lower limit of the condition (10) causes insufficient chromatic aberration correction on the short wavelength side, which may make it difficult to perform the chromatic aberration correction in the entire visible wavelength range.

From a viewpoint of the chromatic aberration correction on the short wavelength side, it is more preferable that the numerical range of the condition (10) be changed to the following range:

$$0.582<\theta gFGH<0.86 \quad (10\text{-}1).$$

It is more desirable to satisfy the following condition (10-2):

$$0.584<\theta gFGH<0.82 \quad (10\text{-}2).$$

Each embodiment uses a high dispersion material for forming the positive optical element GP having the positive refractive power to correct the chromatic aberration well, the positive optical element GP corresponding to the first optical element GH in each embodiment. In other words, each embodiment forms the positive optical element GP by using a material whose dispersion is equivalent to or higher than that of the negative optical element GN included in the first lens unit.

That is, it is desirable to satisfy the following condition (11) where $\upsilon dGPmin$ represents an Abbe number of a first material for the d-line, and $\upsilon dGNmin$ represents an Abbe number of a second material for the d-line. The first material is a material whose Abbe number is minimum in at least one material forming the at least one positive optical element GP, and the second material is a material whose Abbe number is minimum in at least one material forming the at least one negative optical element GN.

$$0.50<|\upsilon dGPmin/\upsilon dGNmin|<1.60 \quad (11)$$

A value of $|\upsilon dGPmin/\upsilon dGNmin|$ higher than the upper limit of the condition (11) makes it difficult to correct the chromatic aberration well. It is more preferable that the numerical range of the condition (11) be changed to the following range. The satisfaction of the following condition (11-1) makes it possible to correct the chromatic aberration better.

$$0.54<|\upsilon dGPmin/\upsilon dGNmin|<1.50 \quad (11\text{-}1).$$

It is still more preferable that the numerical range of the condition (11-1) be changed to the following range:

$$0.58<|\upsilon dGPmin/\upsilon dGNmin|<1.30 \quad (11\text{-}2).$$

It is further more preferable that the numerical range of the condition (11-2) be changed to the following range:

$$0.60<|\upsilon dGPmin/\upsilon dGNmin|<1.20 \quad (11\text{-}3).$$

It is yet further more preferable that the numerical range of the condition (11-3) be changed to the following range:

$$0.62<|\upsilon dGPmin/\upsilon dGNmin|<1.10 \quad (11\text{-}4).$$

In each embodiment, it is more preferable that a focal length f1 of the first lens unit and a focal length f of the entire optical system satisfy the following condition (12). When the optical system is a zoom lens, as the focal length f of the entire optical system, a focal length thereof at a telephoto end is used.

$$0.75<f/f1<4.00 \quad (12)$$

In the optical system satisfying the condition (12), providing the first optical element satisfying the conditions (1) to (3) enables suppression of the variation of the various aberrations with the focusing.

Changing the numerical range of the condition (12) to the following range enables provision of a more sufficient effect of suppressing the variation of the various aberrations with the focusing:

$$0.8 < f/f1 < 3.5 \quad (12\text{-}1).$$

It is more desirable that the numerical range of the condition (12-1) be changed to the following range:

$$0.85 < f/f1 < 3.2 \quad (12\text{-}2).$$

It is still more desirable that the numerical range of the condition (12-2) be changed to the following range:

$$0.88 < f/f1 < 3.0 \quad (12\text{-}3).$$

The optical system of each embodiment can be used as an image taking optical system for an optical apparatus such as an image pickup apparatus (a video camera, a digital still camera and the like) and an interchangeable lens. Moreover, the optical system of each embodiment can be used as an observation optical system for an observation apparatus that is an optical apparatus such as a telescope.

In a cross-sectional view of the optical system of each embodiment shown in the accompanying drawings, reference character Li (i=1, 2, . . . ) denotes an i-th lens unit. Reference character SP denotes an aperture stop, and reference character IP denotes an image plane (or an image surface) where an image-pickup surface of an image-pickup element (photoelectric conversion element) such as a CCD sensor or a CMOS sensor is disposed in the image pickup apparatus.

Reference character GHi (i=1, 2, . . . ) denotes the at least one first optical element GH that satisfies the conditions (1) to (3) and is included in the first lens unit.

In aberration charts, d, g, C, and F respectively represent aberrations for d-, g-, C- and F-lines. Reference characters ΔM and ΔS respectively denote aberrations on a meridional image surface and a sagittal image surface. Reference character ω denotes a half angle of view, and reference character Fno denotes an F number. Reference characters SPH, AS, DIST and CHRO respectively represent spherical aberration, astigmatism, distortion and lateral chromatic aberration.

[Embodiment 1]

FIG. 1 shows a cross-section of an optical system that is a first embodiment (Embodiment 1) of the present invention. The optical system includes, in order from an object side to an image side, a first lens unit L1 having a positive refractive power, a second lens unit L2 having a negative refractive power, an aperture stop SP, a third lens unit L3 having a positive refractive power and a fourth lens unit L4 having a positive refractive power.

During focusing, the first lens unit L1 and the fourth lens unit L4 are unmoved (fixed) with respect to an image plane IP. Moving the second lens unit L2 to the image side and moving the third lens unit L3 to the object side respectively in an optical axis direction enable focusing from an infinite distance to a close distance.

In this embodiment, the first lens unit L1 disposed further on the object side than the aperture stop SP includes one first optical element GH1. A refractive power φGH of the first optical element GH1 when its light-entrance surface and its light-exit surface are in contact with air satisfies the condition (1).

Moreover, a refractive index ndGH and an Abbe number υdGH of a material forming the first optical element GH1 for the d-line respectively satisfy the condition (2) and the condition (3).

A refractive power φ1 of the first lens unit L1 and a refractive power φ2 of the second lens unit L2 satisfy the condition (4). A sum total ΣφGH of the refractive power φGH of the first optical element GH1 satisfies the condition (5).

The optical system of this embodiment has a maximum image-forming magnification βmax of 1.0, which means that the optical system is capable of image-forming at a same magnification.

Moreover, respective numerical values of the optical system of this embodiment satisfy the conditions (6) to (9). A partial dispersion ratio of the material forming the first optical element GH1 for the g-line satisfies the condition (10). In addition, υdGPmin (υdGHmin) and υdGNmin satisfy the condition (11).

This embodiment provides the first optical element GH1 formed of a relatively high dispersion material in the first lens unit L1 so as to correct variation of various aberrations with the focusing from the infinite distance to the close distance. In particular, this embodiment is capable of correcting, variation of chromatic spherical aberration with the focusing. This applies to Embodiments 2 to 8 described below.

Figure 2A:
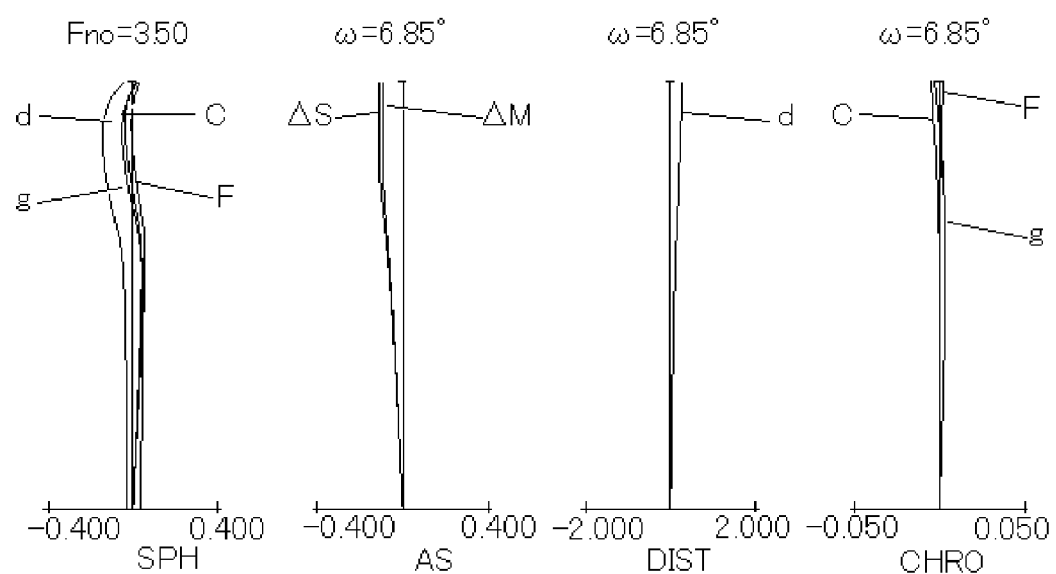
FIGS. 2A, 2B and 2C show aberrations of the optical system of Embodiment 1.
Figure 2B:
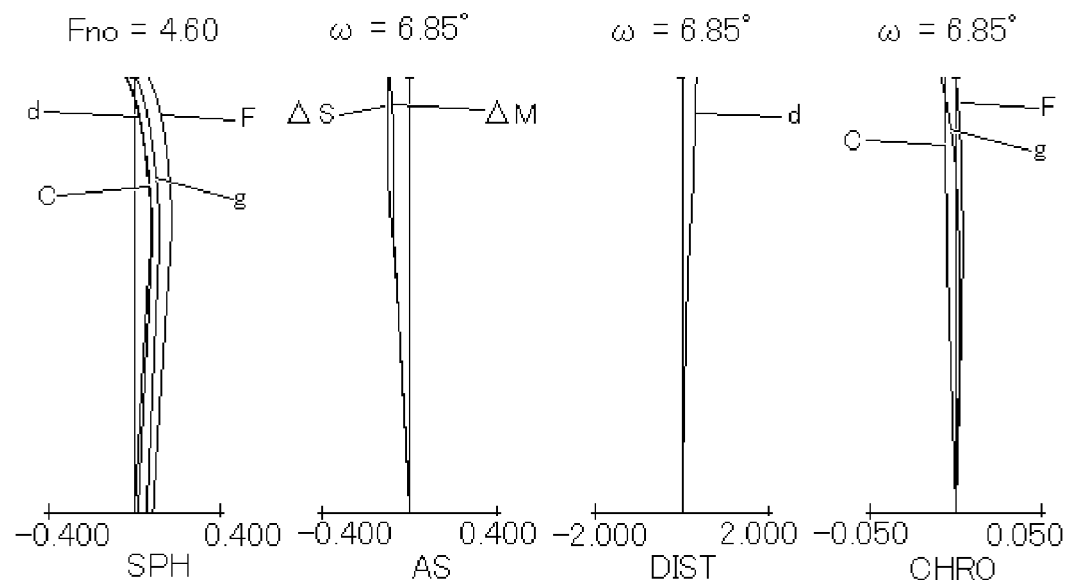
Figure 2C:
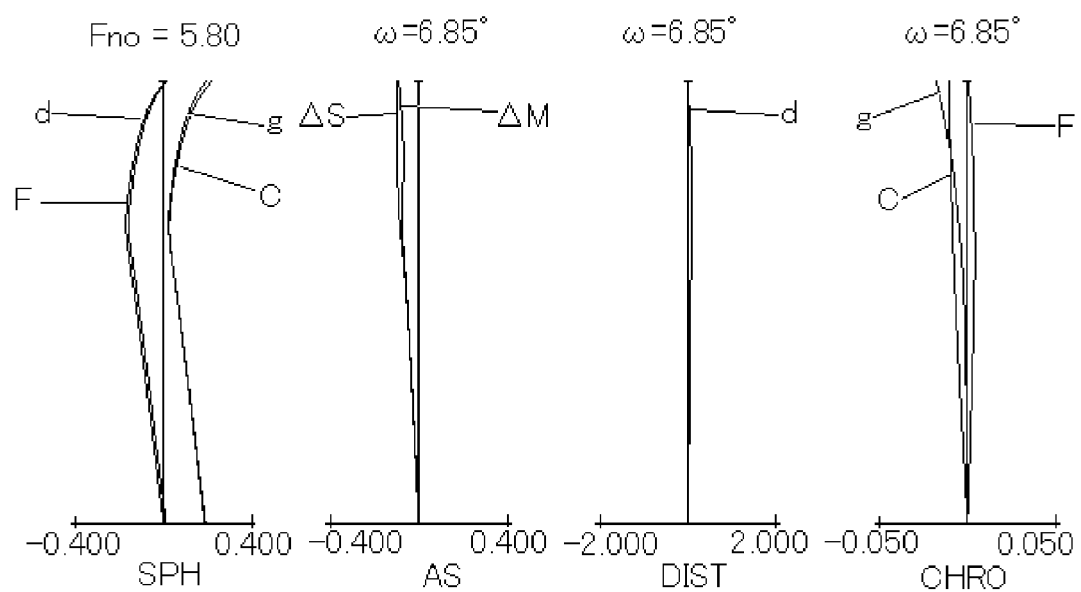

FIGS. 2A, 2B and 2C respectively show aberrations in states where the optical system of this embodiment is focused on an infinite distance object, a close distance object at an image-forming magnification of 0.5 and a close distance object at the maximum image-forming magnification.

[Embodiment 2]

Figure 3:
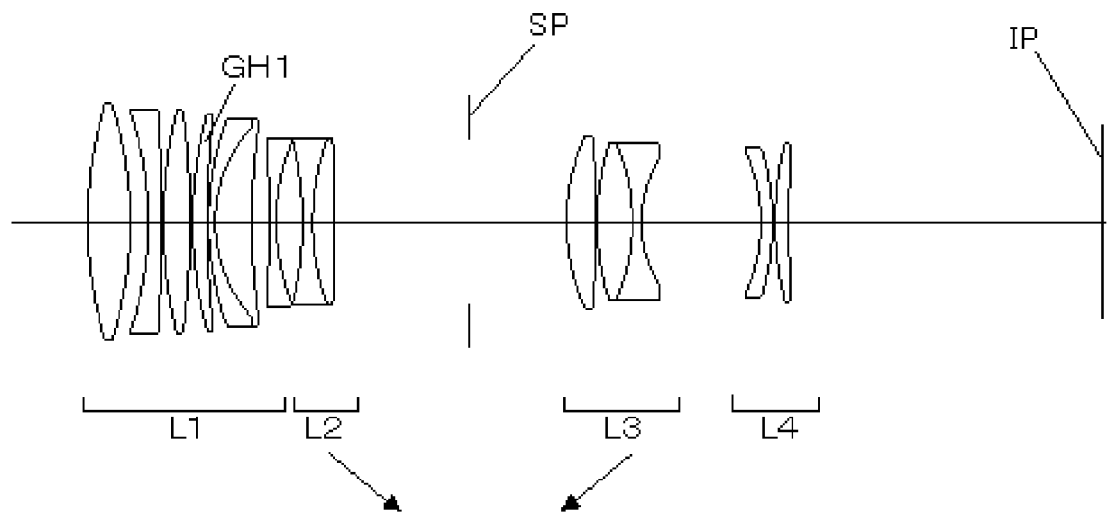
FIG. 3 is a cross-sectional view showing an optical system of Embodiment 2 of the present invention.

FIG. 3 shows a cross-section of an optical system that is a second embodiment (Embodiment 2) of the present invention. The optical system includes, in order from an object side to an image side, a first lens unit L1 having a positive refractive power, a second lens unit L2 having a negative refractive power, an aperture stop SP, a third lens unit L3 having a positive refractive power and a fourth lens unit L4 having a negative refractive power.

During focusing, the first lens unit L1 and the fourth lens unit L4 are unmoved (fixed) with respect to an image plane IP. Moving the second lens unit L2 to the image side and moving the third lens unit L3 to the object side respectively in an optical axis direction enable focusing from an infinite distance to a close distance.

In this embodiment, the first lens unit L1 disposed further on the object side than the aperture stop SP includes one first optical element GH1.

Respective numerical values of the optical system of this embodiment satisfy the conditions (1) to (12). The optical system of this embodiment has a maximum image-forming magnification βmax of 1.0, which means that the optical system is capable of image-forming at a same magnification.

Figure 4A:
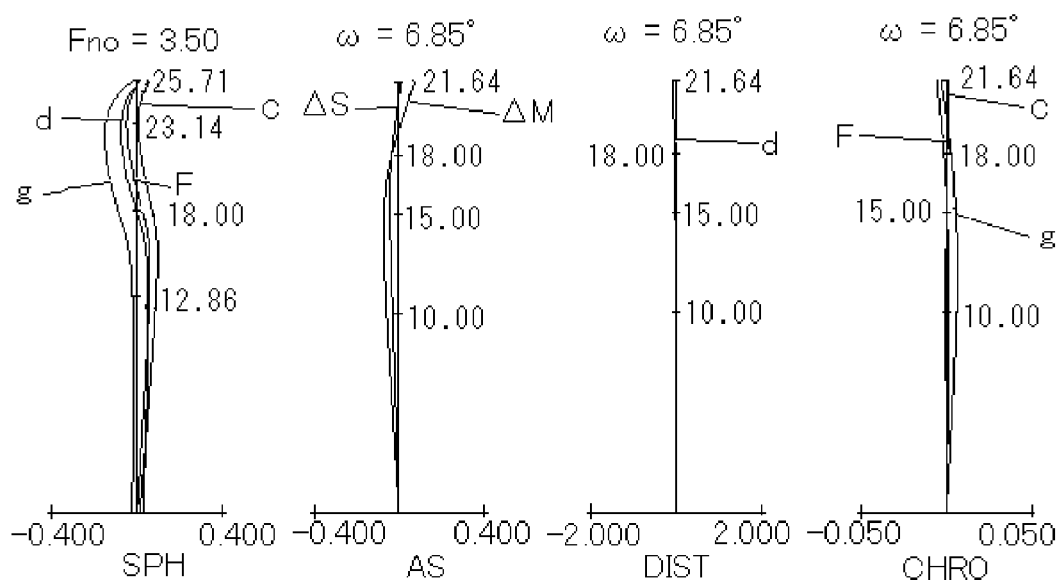
FIGS. 4A, 4B and 4C show aberrations of the optical system of Embodiment 2.
Figure 4B:
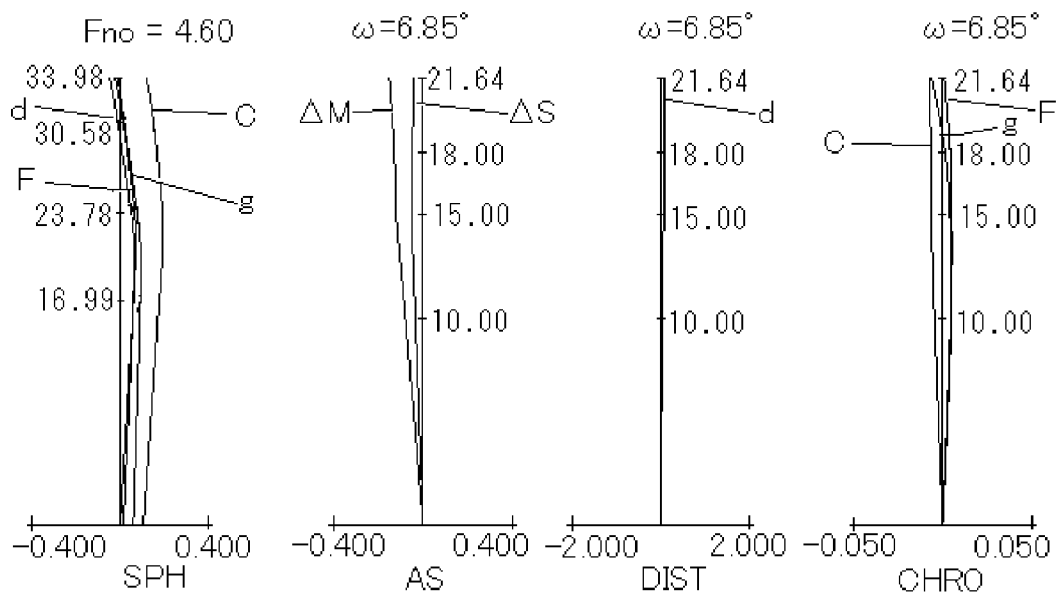
Figure 4C:
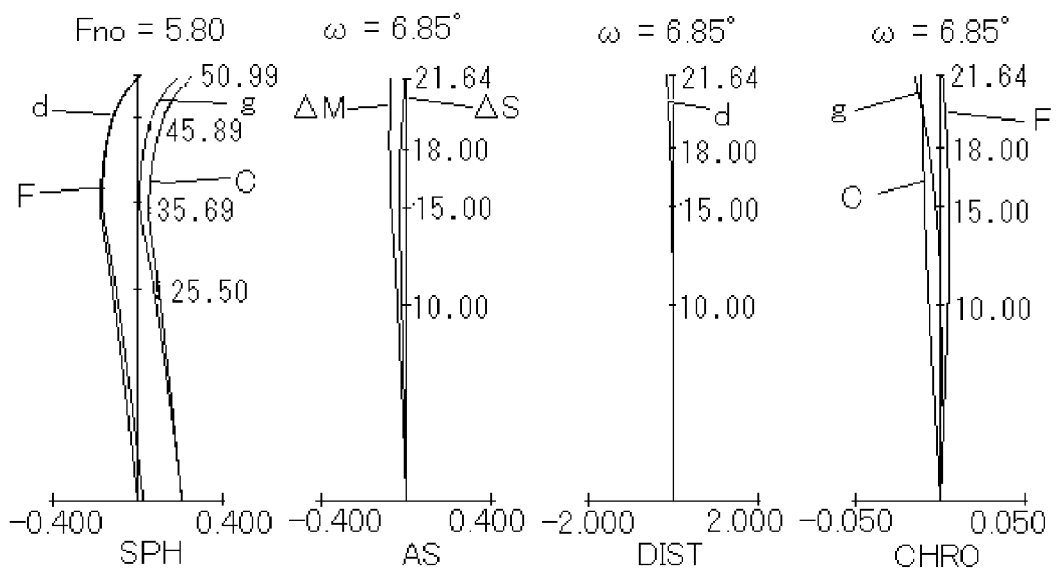

FIGS. 4A, 4B and 4C respectively show aberrations in states where the optical system of this embodiment is focused on an infinite distance object, a close distance object at an image-forming magnification of 0.5 and a close distance object at the maximum image-forming magnification.

[Embodiment 3]

Figure 5:
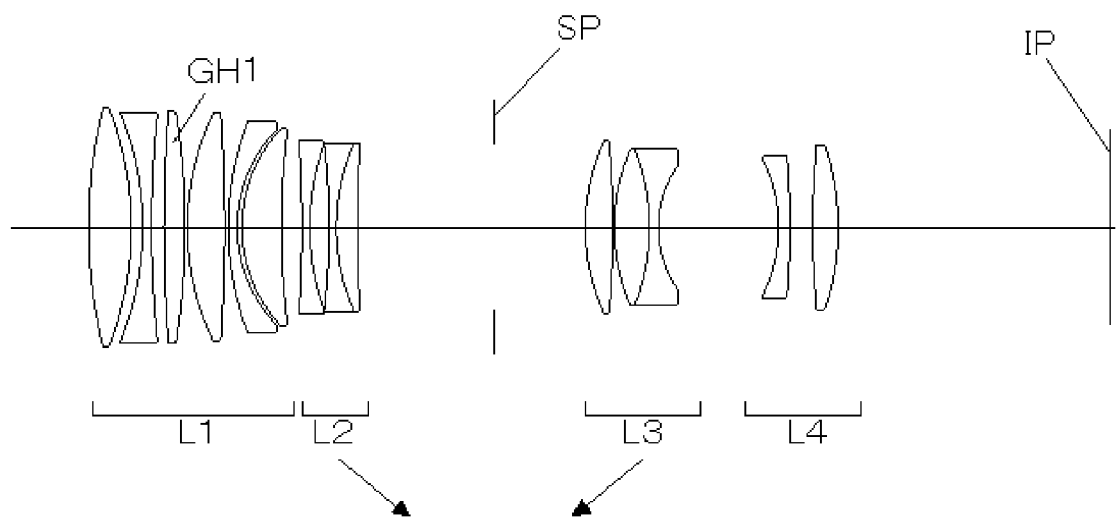
FIG. 5 is a cross-sectional view showing an optical system of Embodiment 3 of the present invention.

FIG. 5 shows a cross-section of an optical system that is a third embodiment (Embodiment 3) of the present invention. The optical system includes, in order from an object side to an image side, a first lens unit L1 having a positive refractive power, a second lens unit L2 having a negative refractive power, an aperture stop SP, a third lens unit L3 having a positive refractive power and a fourth lens unit L4 having a negative refractive power.

During focusing, the first lens unit L1 and the fourth lens unit L4 are unmoved (fixed) with respect to an image plane IP. Moving the second lens unit L2 to the image side and moving the third lens unit L3 to the object side respectively in an optical axis direction enable focusing from an infinite distance to a close distance.

In this embodiment, the first lens unit L1 disposed further on the object side than the aperture stop SP includes one first optical element GH1.

Respective numerical values of the optical system of this embodiment satisfy the conditions (1) to (12). The optical system of this embodiment has a maximum image-forming magnification βmax of 1.0, which means that the optical system is capable of image-forming at a same magnification.

Figure 6A:
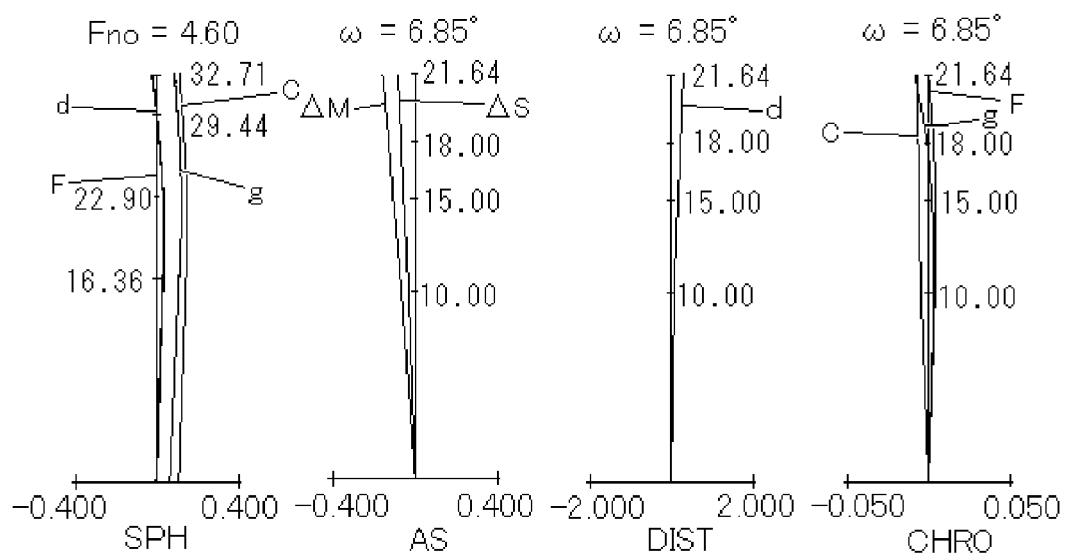
FIGS. 6A, 6B and 6C show aberrations of the optical system of Embodiment 3.
Figure 6B:
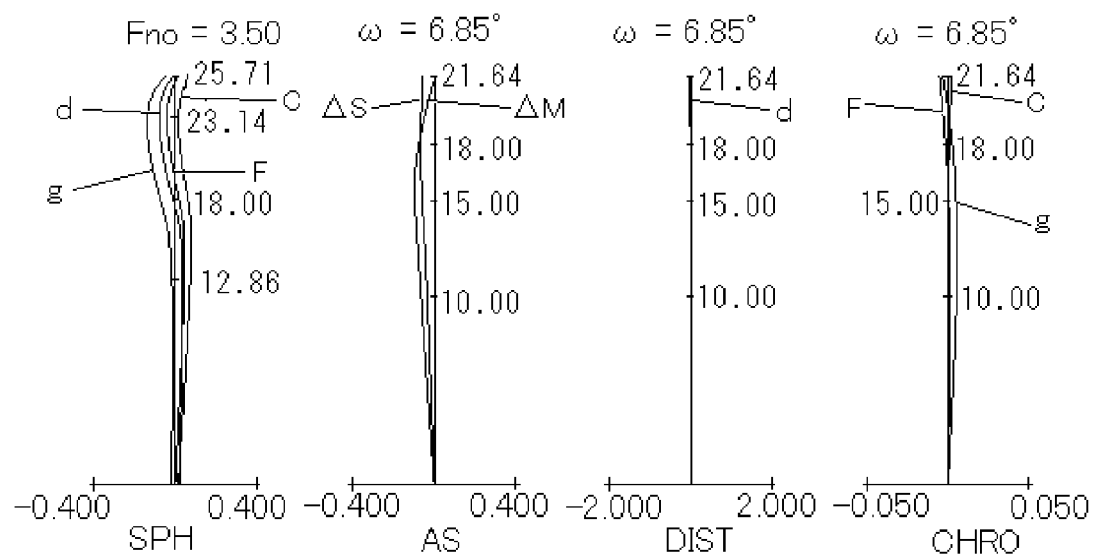
Figure 6C:
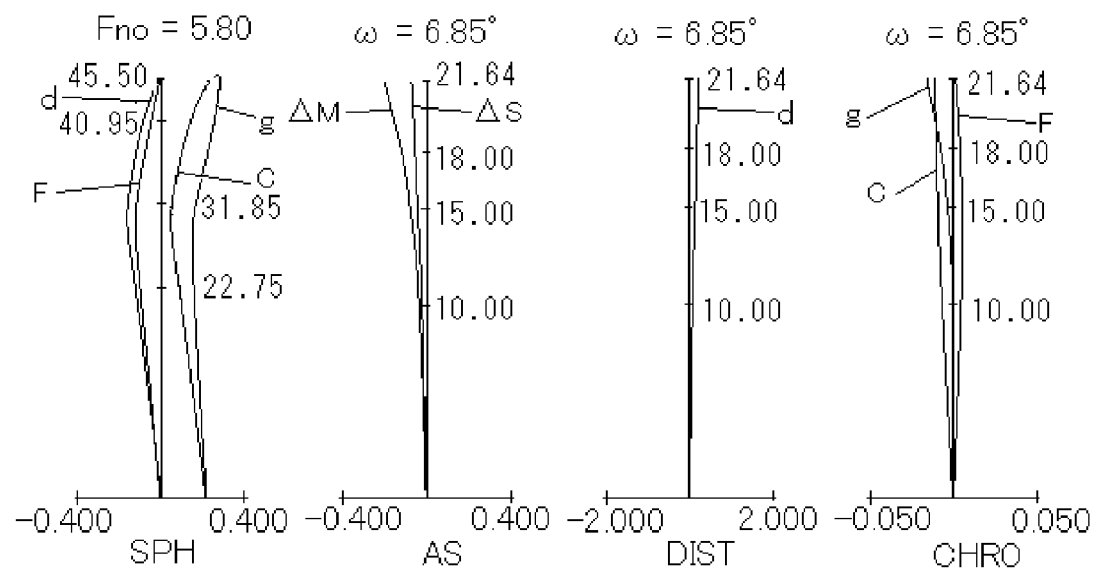

FIGS. 6A, 6B and 6C respectively show aberrations in states where the optical system of this embodiment is focused on an infinite distance object, a close distance object at an image-forming magnification of 0.5 and a close distance object at the maximum image-forming magnification.

[Embodiment 4]

Figure 7:
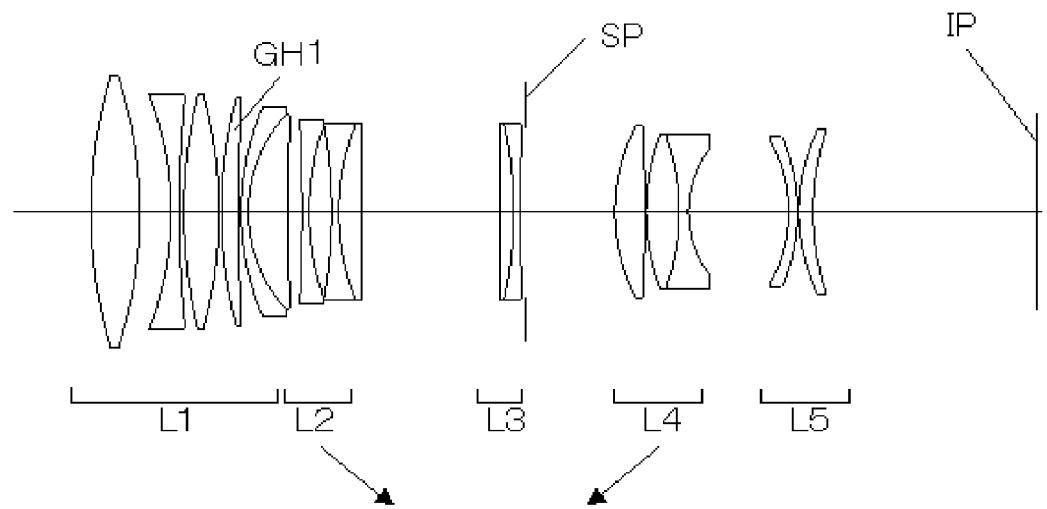
FIG. 7 is a cross-sectional view showing an optical system of Embodiment 4 of the present invention.

FIG. 7 shows a cross-section of an optical system that is a fourth embodiment (Embodiment 4) of the present invention. The optical system includes, in order from an object side to an image side, a first lens unit L1 having a positive refractive power, a second lens unit L2 having a negative refractive power, a third lens unit L3 having a positive refractive power, an aperture stop SP, a fourth lens unit L4 having a positive refractive power and a fifth lens unit L5 having a positive refractive power.

During focusing, the first lens unit L1, the third lens unit L3 and the fifth lens unit L5 are unmoved (fixed) with respect to an image plane IP. Moving the second lens unit L2 to the image side and moving the fourth lens unit L4 to the object side respectively in an optical axis direction enable focusing from an infinite distance to a close distance.

In this embodiment, the first lens unit L1 disposed further on the object side than the aperture stop SP includes one first optical element GH1.

Respective numerical values of the optical system of this embodiment satisfy the conditions (1) to (12). The optical system of this embodiment has a maximum image-forming magnification βmax of 1.0, which means that the optical system is capable of image-forming at a same magnification.

Figure 8A:
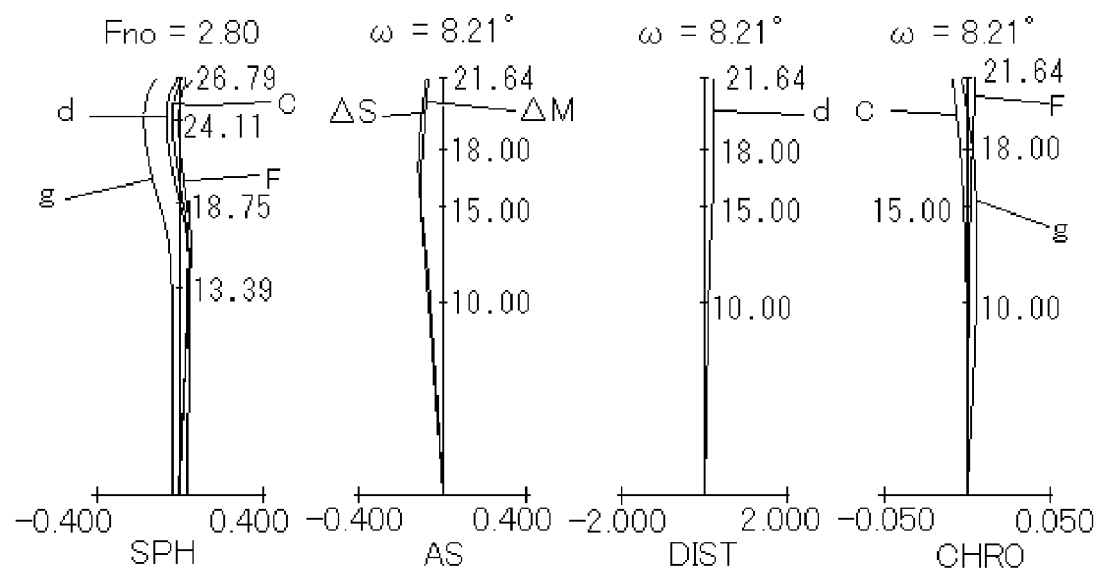
FIGS. 8A, 8B and 8C show aberrations of the optical system of Embodiment 4.
Figure 8B:
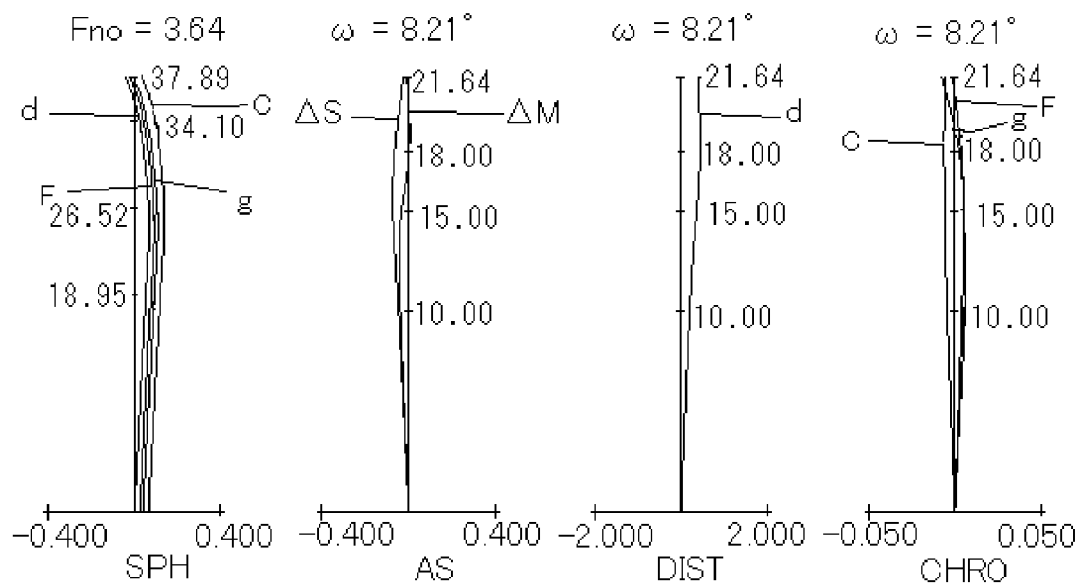
Figure 8C:
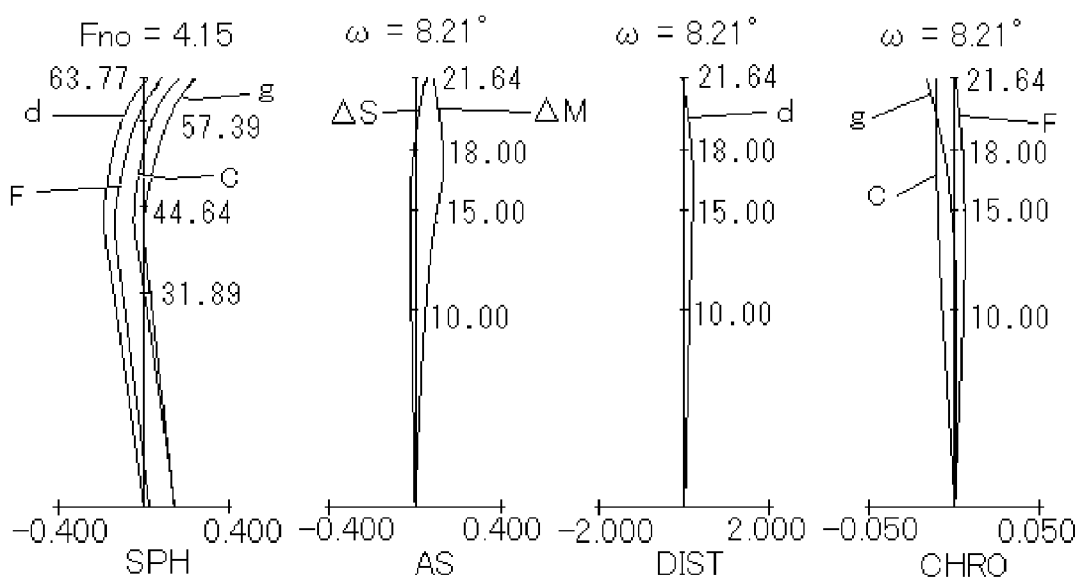

FIGS. 8A, 8B and 8C respectively show aberrations in states where the optical system of this embodiment is focused on an infinite distance object, a close distance object at an image-forming magnification of 0.5 and a close distance object at the maximum image-forming magnification.

[Embodiment 5]

Figure 9:
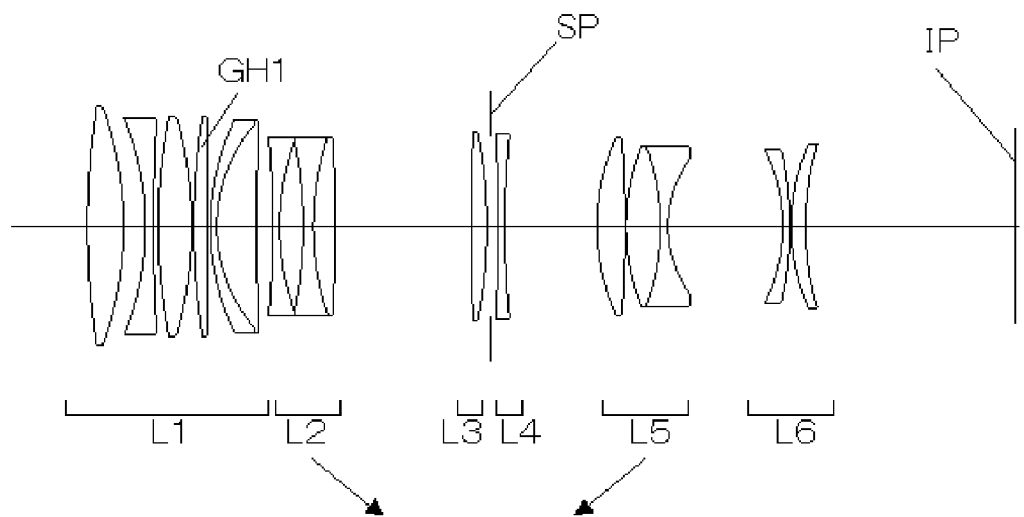
FIG. 9 is a cross-sectional view showing an optical system of Embodiment 5 of the present invention.

FIG. 9 shows a cross-section of an optical system that is a fifth embodiment (Embodiment 5) of the present invention. The optical system includes, in order from an object side to an image side, a first lens unit L1 having a positive refractive power, a second lens unit L2 having a negative refractive power, a third lens unit L3 having a positive refractive power, an aperture stop SP, a fourth lens unit L4 having a negative refractive power, a fifth lens unit L5 having a positive refractive power and a sixth lens unit L6 having a positive refractive power.

During focusing, the first lens unit L1, the third lens unit L3, the fourth lens unit L4 and the sixth lens unit L6 are unmoved (fixed) with respect to an image plane IP. Moving the second lens unit L2 to the image side and moving the fifth lens unit L5 to the object side respectively in an optical axis direction enable focusing from an infinite distance to a close distance.

In this embodiment, the first lens unit L1 disposed further on the object side than the aperture stop SP includes one first optical element GH1.

Respective numerical values of the optical system of this embodiment satisfy the conditions (1) to (12). The optical system of this embodiment has a maximum image-forming magnification βmax of 1.0, which means that the optical system is capable of image-forming at a same magnification.

Figure 10A:
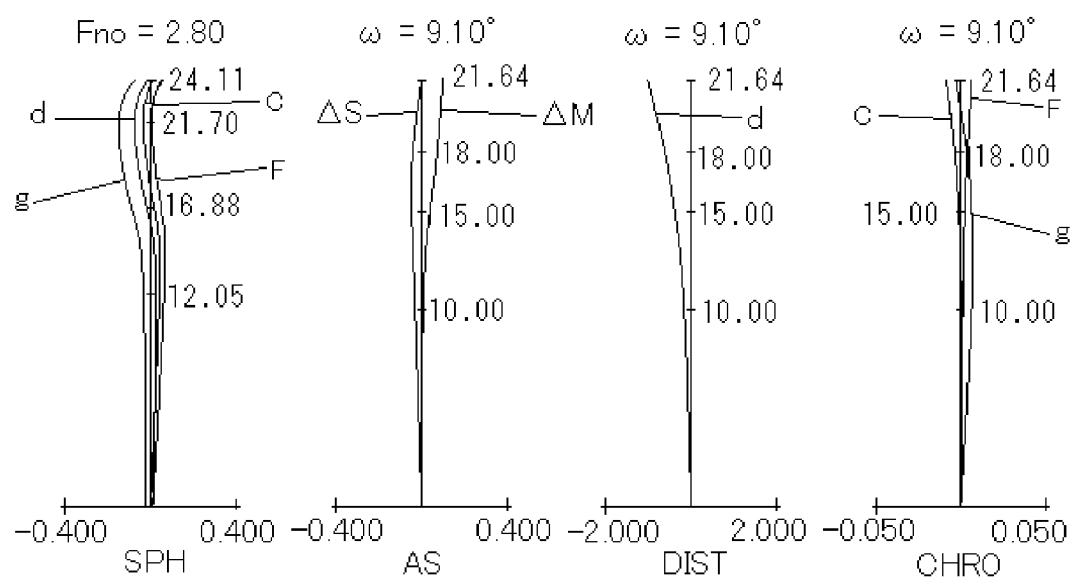
FIGS. 10A, 10B and 10C show aberrations of the optical system of Embodiment 5.
Figure 10B:
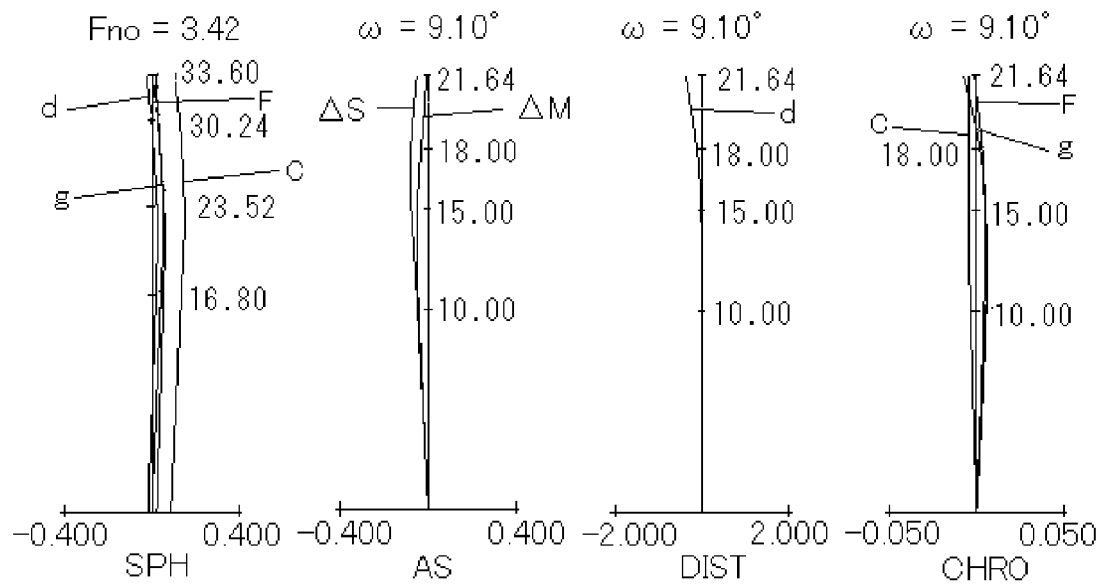
Figure 10C:
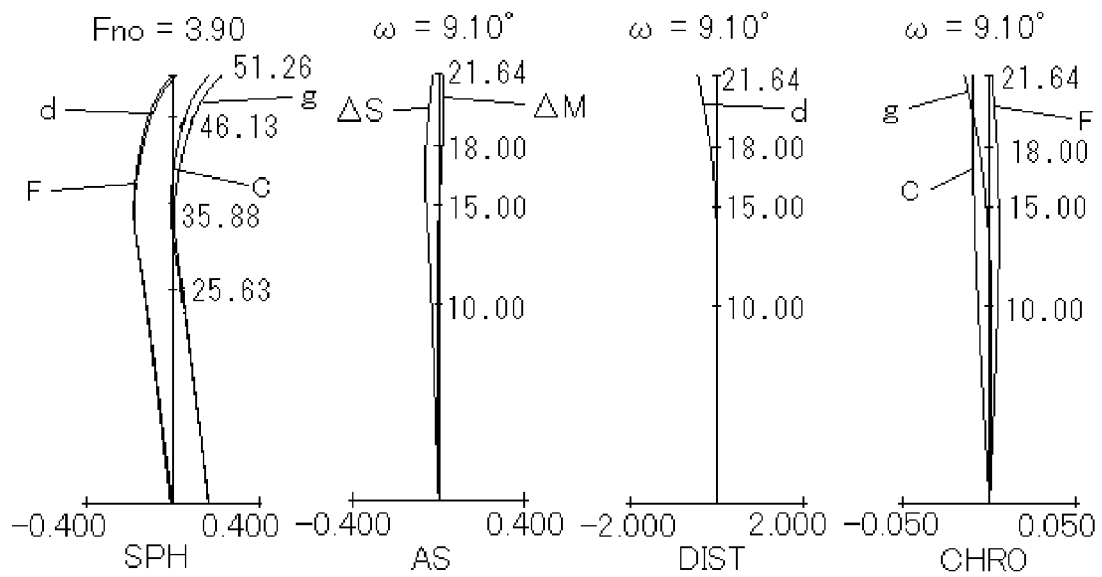

FIGS. 10A, 10B and 10C respectively show aberrations in states where the optical system of this embodiment is focused on an infinite distance object, a close distance object at an image-forming magnification of 0.5 and a close distance object at the maximum image-forming magnification.

[Embodiment 6]

Figure 11:
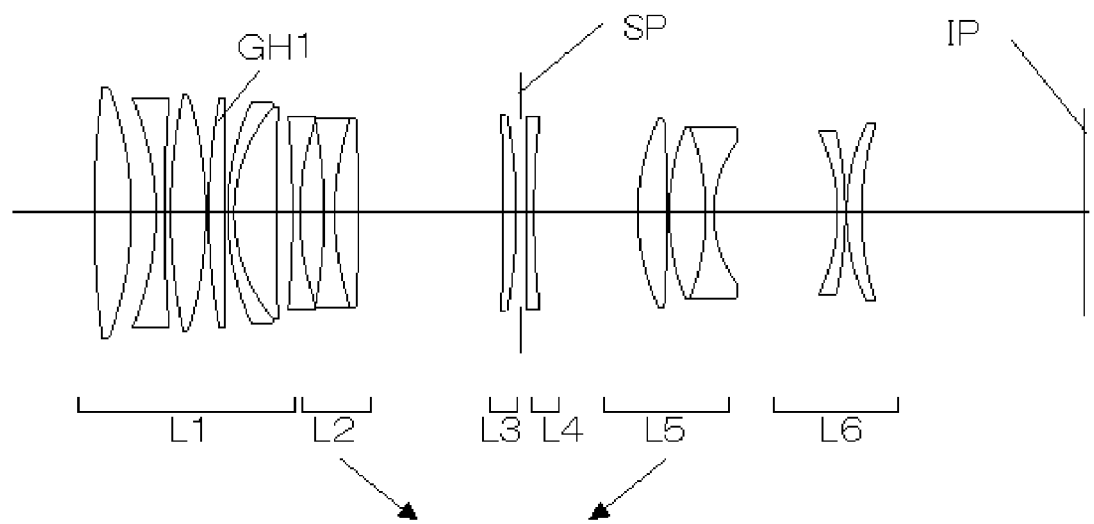
FIG. 11 is a cross-sectional view showing an optical system of Embodiment 6 of the present invention.

FIG. 11 shows a cross-section of an optical system that is a sixth embodiment (Embodiment 6) of the present invention. The optical system includes, in order from an object side to an image side, a first lens unit L1 having a positive refractive power, a second lens unit L2 having a negative refractive power, a third lens unit L3 having a positive refractive power, an aperture stop SP, a fourth lens unit L4 having a negative refractive power, a fifth lens unit L5 having a positive refractive power and a sixth lens unit L6 having a positive refractive power.

During focusing, the first lens unit L1, the third lens unit L3, the fourth lens unit L4 and the sixth lens unit L6 are unmoved (fixed) with respect to an image plane IP. Moving the second lens unit L2 to the image side and moving the fifth lens unit L5 to the object side respectively in an optical axis direction enable focusing from an infinite distance to a close distance.

In this embodiment, the first lens unit L1 disposed further on the object side than the aperture stop SP includes one first optical element GH1.

Respective numerical values of the optical system of this embodiment satisfy the conditions (1) to (12). The optical system of this embodiment has a maximum image-forming magnification βmax of 1.0, which means that the optical system is capable of image-forming at a same magnification.

Figure 12A:
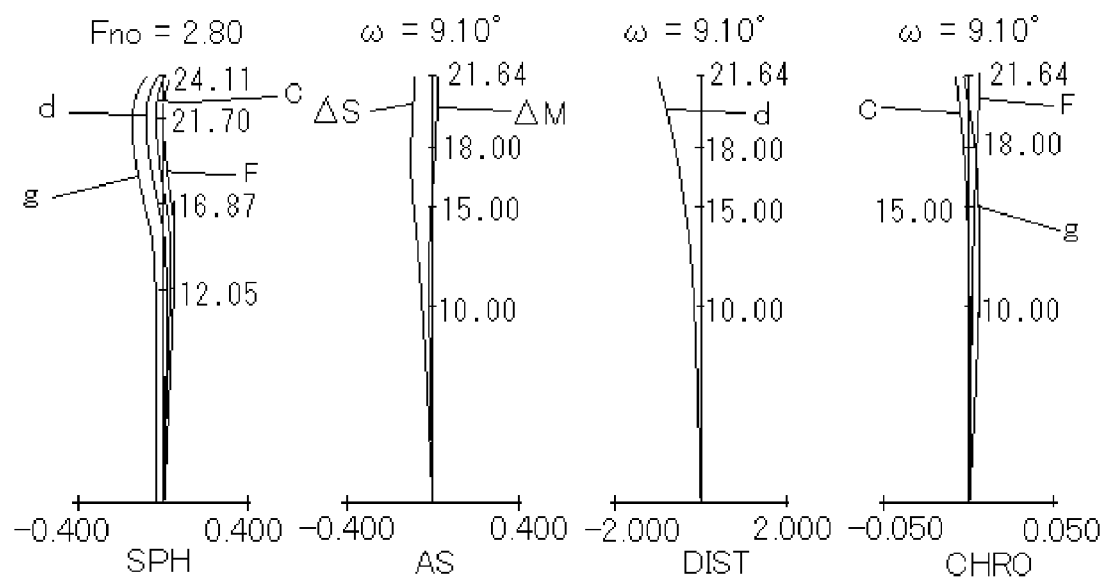
FIGS. 12A, 12B and 12C show aberrations of the optical system of Embodiment 6.
Figure 12B:
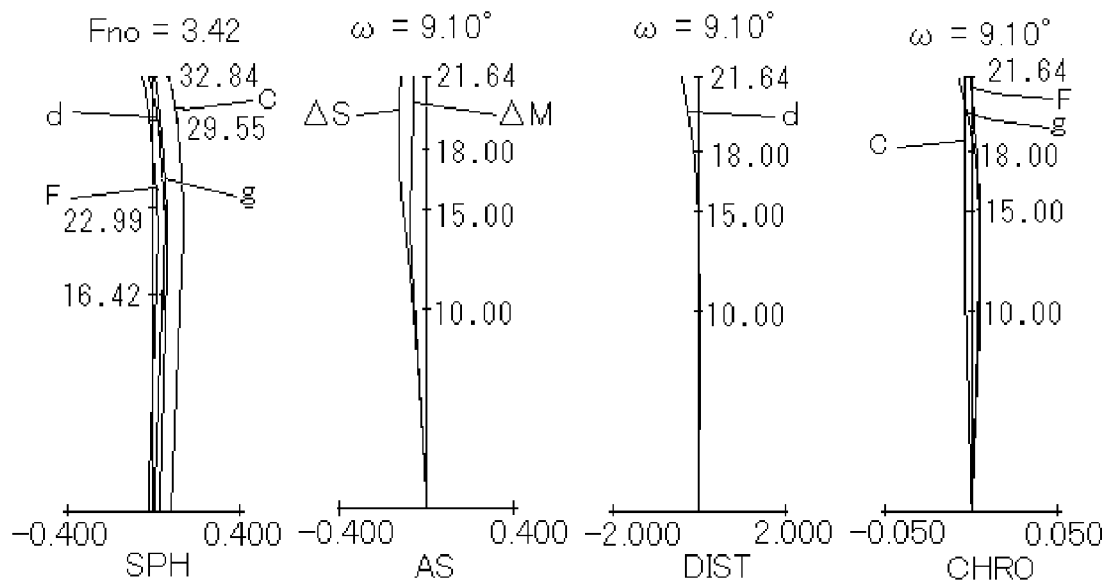
Figure 12C:
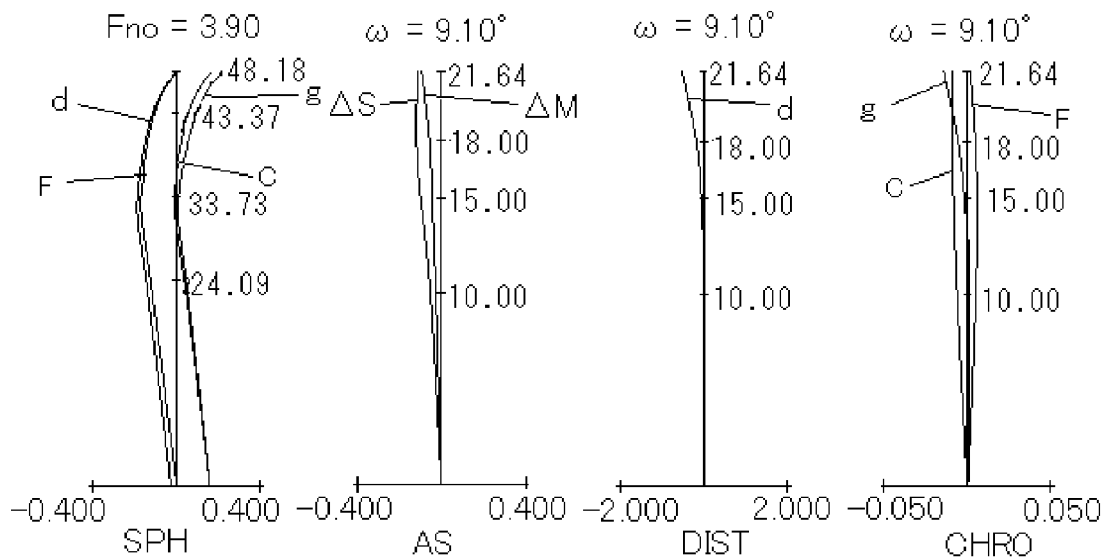

FIGS. 12A, 12B and 12C respectively show aberrations in states where the optical system of this embodiment is focused on an infinite distance object, a close distance object at an image-forming magnification of 0.5 and a close distance object at the maximum image-forming magnification.

[Embodiment 7]

Figure 13:
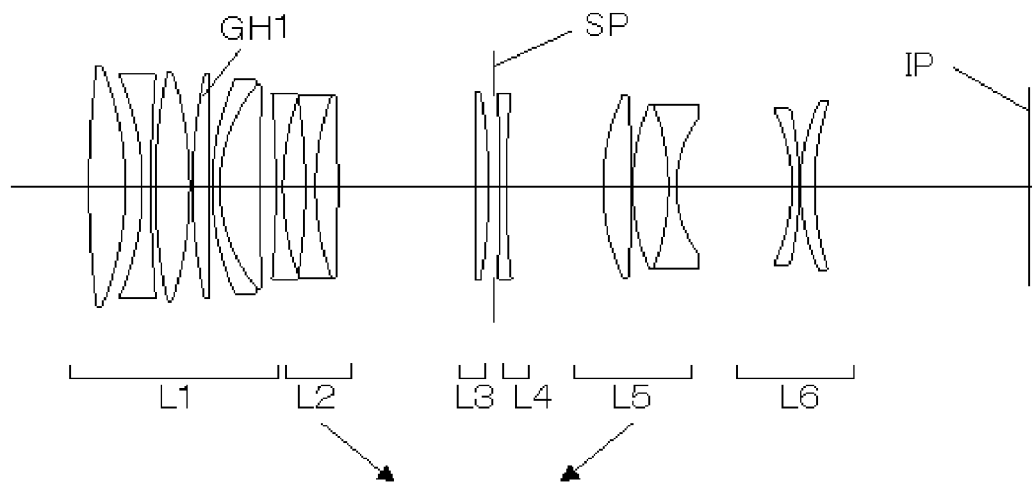
FIG. 13 is a cross-sectional view showing an optical system of Embodiment 7 of the present invention.

FIG. 13 shows a cross-section of an optical system that is a seventh embodiment (Embodiment 7) of the present invention. The optical system includes, in order from an object side to an image side, a first lens unit L1 having a positive refractive power, a second lens unit L2 having a negative refractive power, a third lens unit L3 having a positive refractive power, an aperture stop SP, a fourth lens unit L4 having a negative refractive power, a fifth lens unit L5 having a positive refractive power and a sixth lens unit L6 having a positive refractive power.

During focusing, the first lens unit L1, the third lens unit L3, the fourth lens unit L4 and the sixth lens unit L6 are unmoved (fixed) with respect to an image plane IP. Moving the second lens unit L2 to the image side and moving the fifth lens unit L5 to the object side respectively in an optical axis direction enable focusing from an infinite distance to a close distance.

In this embodiment, the first lens unit L1 disposed further on the object side than the aperture stop SP includes one first optical element GH1.

Respective numerical values of the optical system of this embodiment satisfy the conditions (1) to (12). The optical system of this embodiment has a maximum image-forming magnification βmax of 1.0, which means that the optical system is capable of image-forming at a same magnification.

Figure 14A:
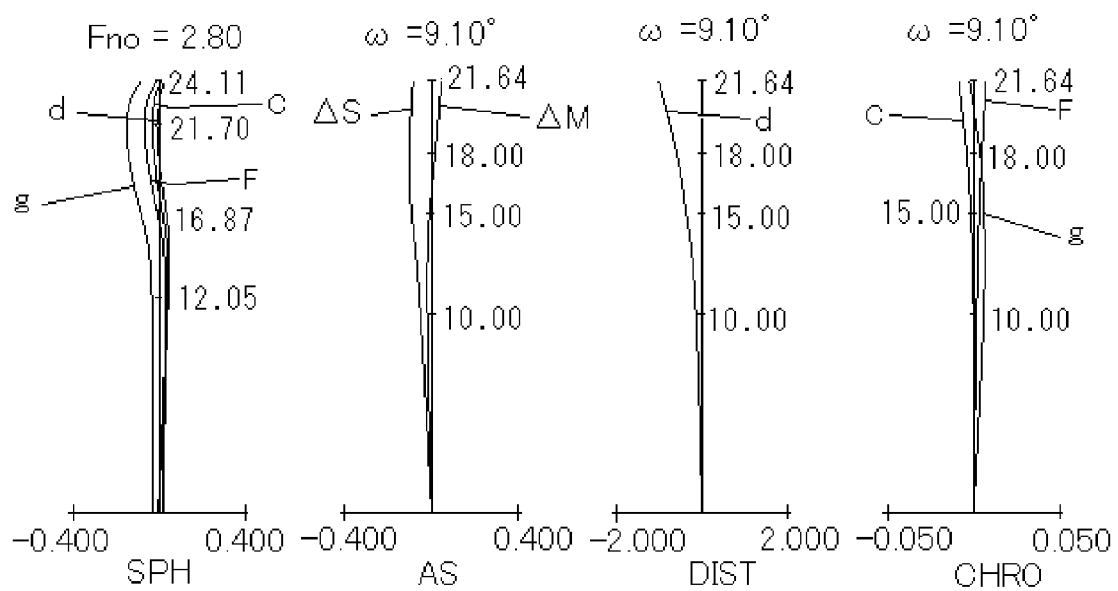
FIGS. 14A, 14B and 14C show aberrations of the optical system of Embodiment 7.
Figure 14B:
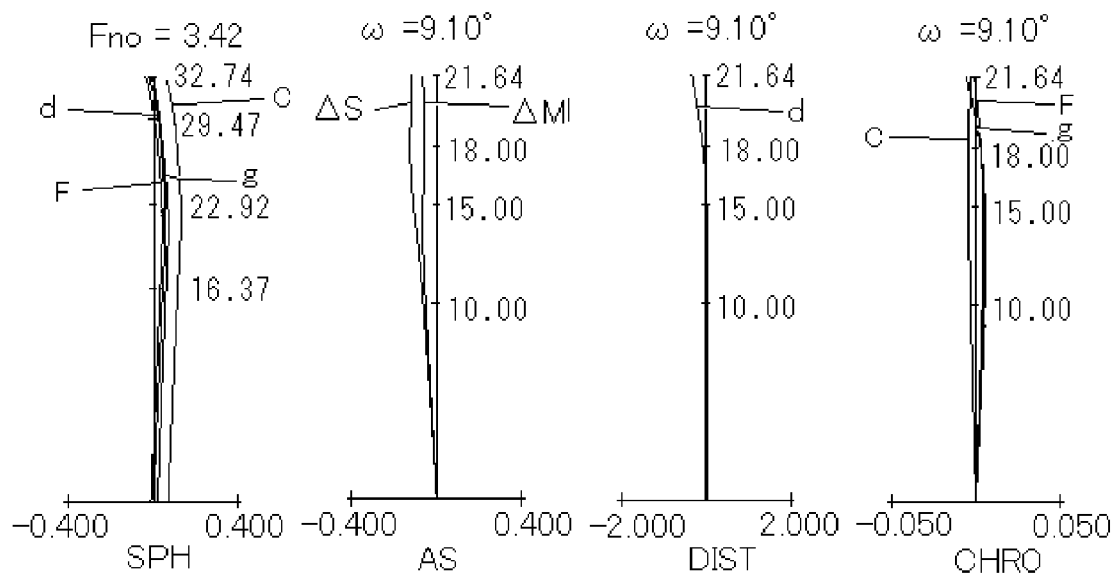
Figure 14C:
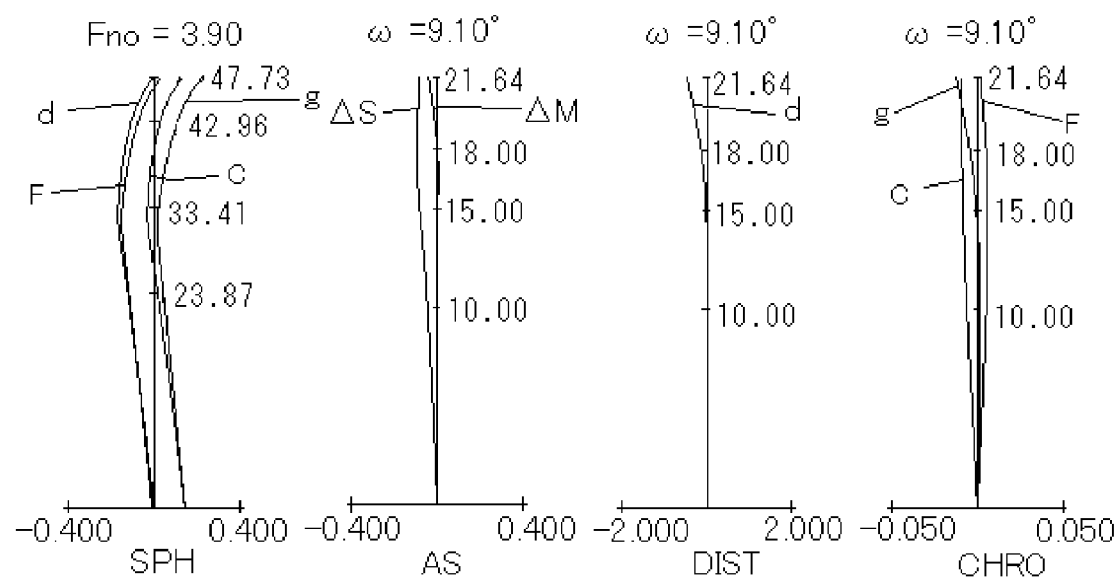

FIGS. 14A, 14B and 14C respectively show aberrations in states where the optical system of this embodiment is focused on an infinite distance object, a close distance object at an image-forming magnification of 0.5 and a close distance object at the maximum image-forming magnification.

[Embodiment 8]

Figure 15:
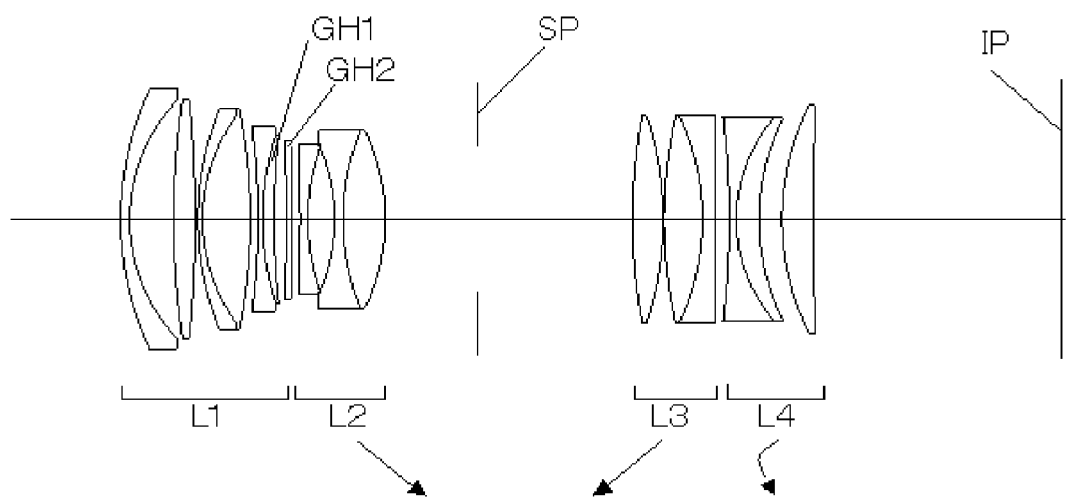
FIG. 15 is a cross-sectional view showing an optical system of Embodiment 8 of the present invention.

FIG. 15 shows a cross-section of an optical system that is an eighth embodiment (Embodiment 8) of the present invention. The optical system includes, in order from an object side to an image side, a first lens unit L1 having a positive refractive power, a second lens unit L2 having a negative refractive power, an aperture stop SP, a third lens unit L3 having a positive refractive power and a fourth lens unit L4 having a negative refractive power.

During focusing, the first lens unit L1 is unmoved (fixed) with respect to an image plane IP. Moving the second lens unit L2 to the image side, moving the third lens unit L3 to the object side and moving the fourth lens unit L4 from the object side to the image side respectively in an optical axis direction enable focusing from an infinite distance to a close distance.

In this embodiment, the first lens unit L1 disposed further on the object side than the aperture stop SP includes two first optical elements GH1 and GH2.

Respective numerical values of the optical system of this embodiment satisfy the conditions (1) to (12). The optical system of this embodiment has a maximum image-forming magnification βmax of 1.0, which means that the optical system is capable of image-forming at a same magnification.

Figure 16A:
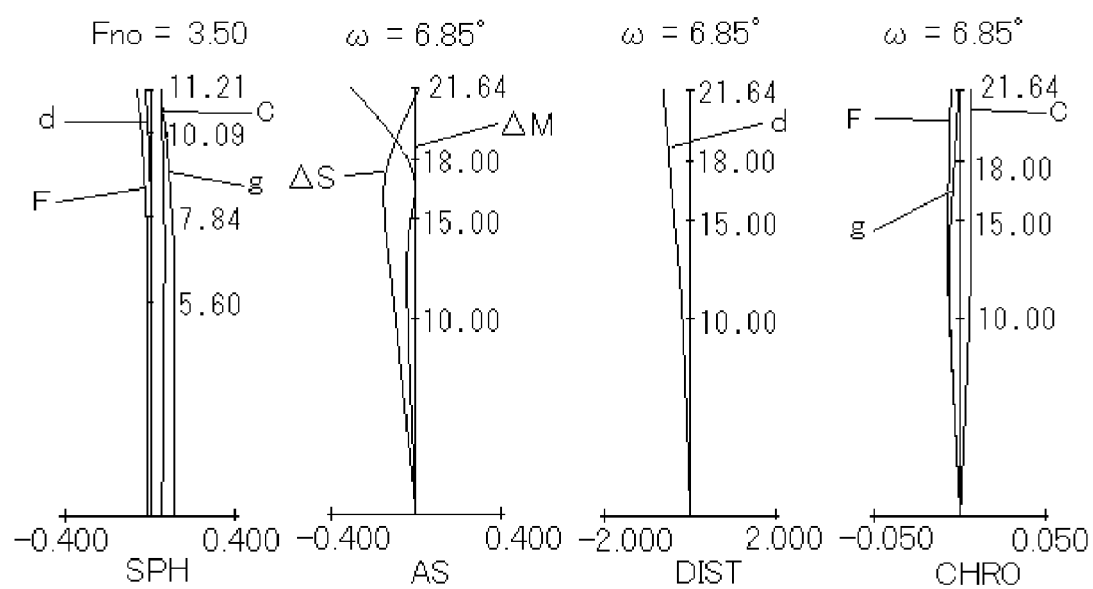
FIGS. 16A, 16B and 16C show aberrations of the optical system of Embodiment 8.
Figure 16B:
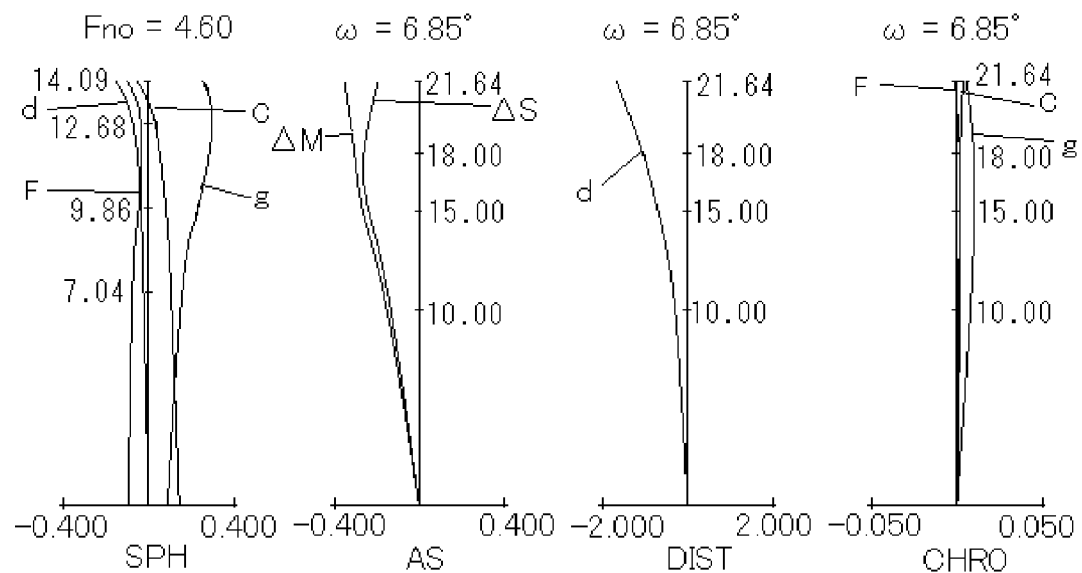
Figure 16C:
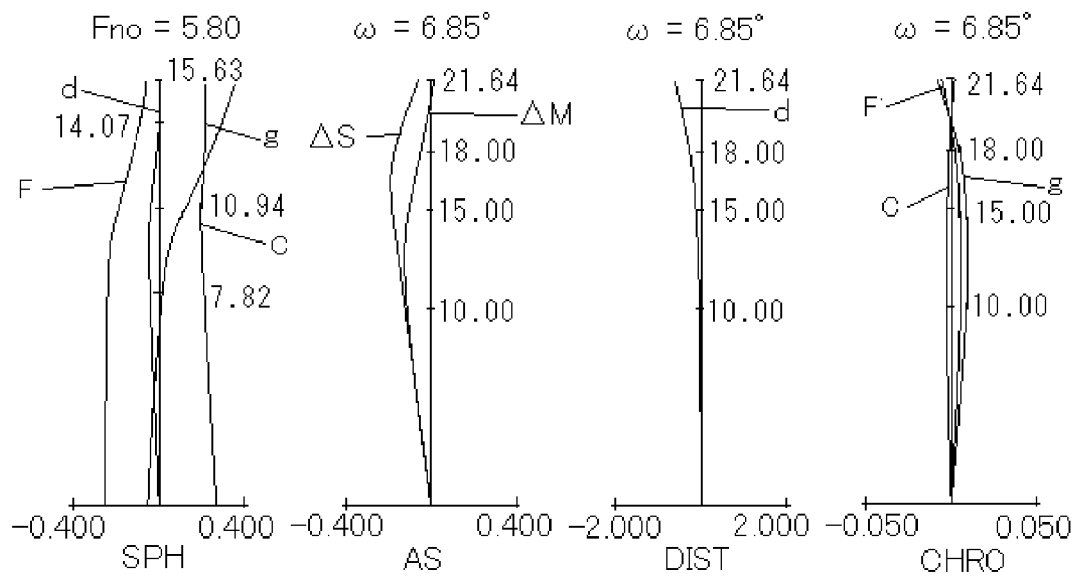

FIGS. 16A, 16B and 16C respectively show aberrations in states where the optical system is focused on an infinite distance object, a close distance object at an image-forming magnification of 0.5 and a close distance object at the maximum image-forming magnification.

[Embodiment 9]

Figure 17A:
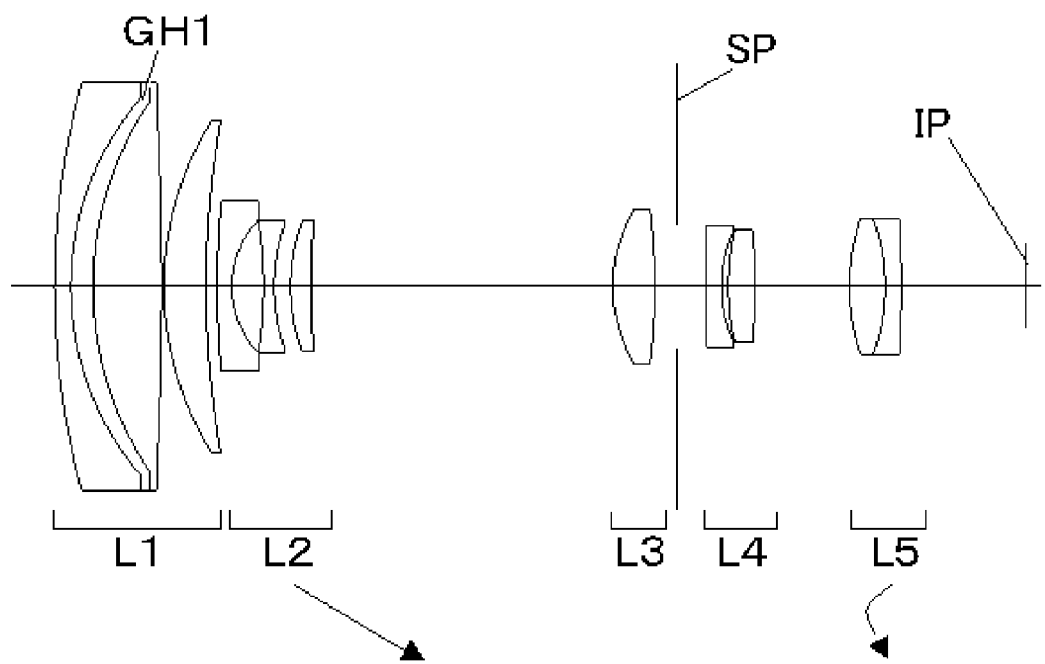
FIGS. 17A and 17B are cross-sectional views showing an optical system of Embodiment 9 of the present invention.
Figure 17B:
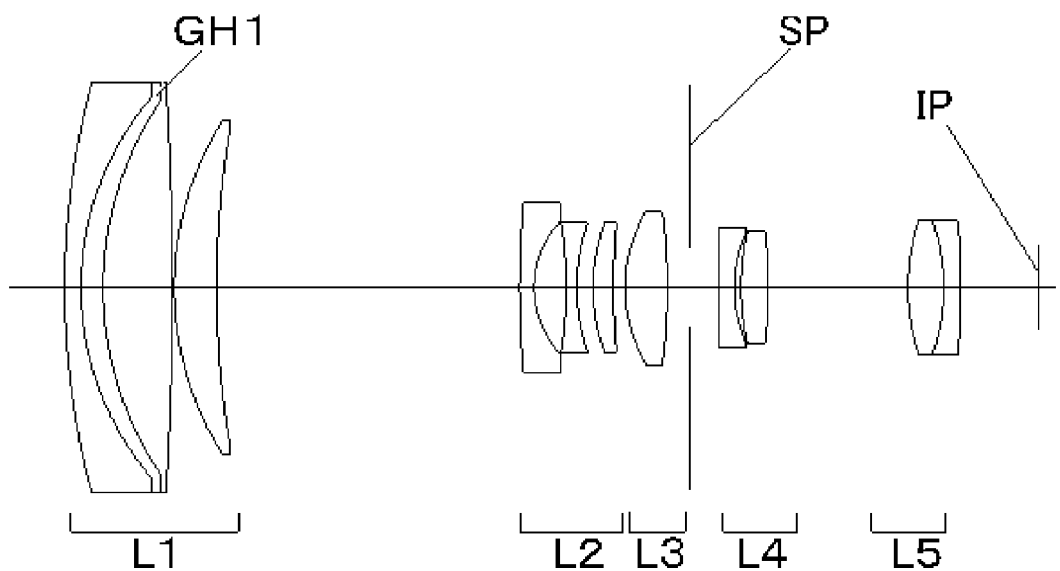

FIGS. 17A and 17B show cross-sections of an optical system that is a ninth embodiment (Embodiment 9) of the present invention. The optical system is a zoom optical system (that is, a zoom lens). FIG. 17A shows the cross-section of the optical system at a wide-angle end, and FIG. 17B shows the cross-section of the optical system at a telephoto end. Arrows in FIG. 17A show movement loci of the second and fifth lens units L2 and L5 during zooming (variation of magnification) from the wide-angle end to the telephoto end.

The optical system includes, in order from an object side to an image side, a first lens unit L1 having a positive refractive power, a second lens unit L2 having a negative refractive power, a third lens unit L3 having a positive refractive power, an aperture stop SP, a fourth lens unit L4 having a negative refractive power and a fifth lens unit L5 having a positive refractive power.

During focusing, the first lens unit L1, the third lens unit L3 and the fourth lens unit L4 are unmoved (fixed) with respect to an image plane IP. Moving the second lens unit L2 to the image side and moving the fifth lens unit L5 from the object side to the image side respectively in an optical axis direction enable focusing from an infinite distance to a close distance.

In this embodiment, the first lens unit L1 disposed further on the object side than the aperture stop SP includes one first optical element GH1. A light-entrance surface and a light-exit surface of the first optical element GH1 are respectively cemented to other optical elements.

Respective numerical values of the optical system of this embodiment satisfy the conditions (1) to (12). A maximum image-forming magnification βmax of the optical system of this embodiment at the wide-angle end is 0.186, and those at a middle zoom position and at the telephoto end are 0.10.

This embodiment provides the first optical element GH1 formed of a relatively high dispersion material in the first lens unit L1 so as to correct variation of various aberrations with zooming and with the focusing from the infinite distance to the close distance. This embodiment enables correction of variation of longitudinal chromatic aberration, chromatic aberration of magnification and chromatic spherical aberration with the focusing at, in particular, the telephoto end. This is the same in Embodiment 10 described later.

Figure 18A:
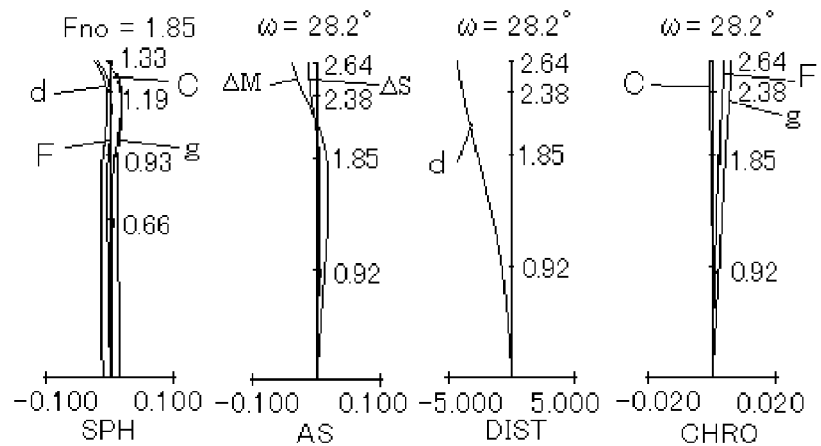
FIGS. 18A, 18B, 18C, 18D, 18E and 18F show aberrations of the optical system of Embodiment 9.
Figure 18B:
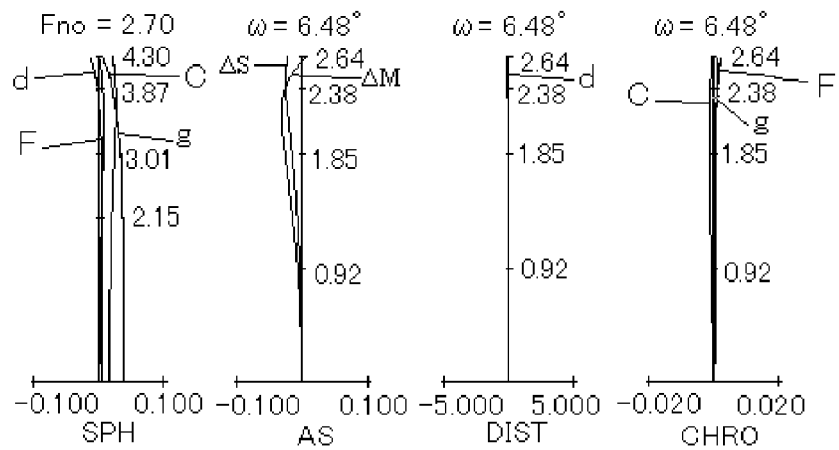
Figure 18C:
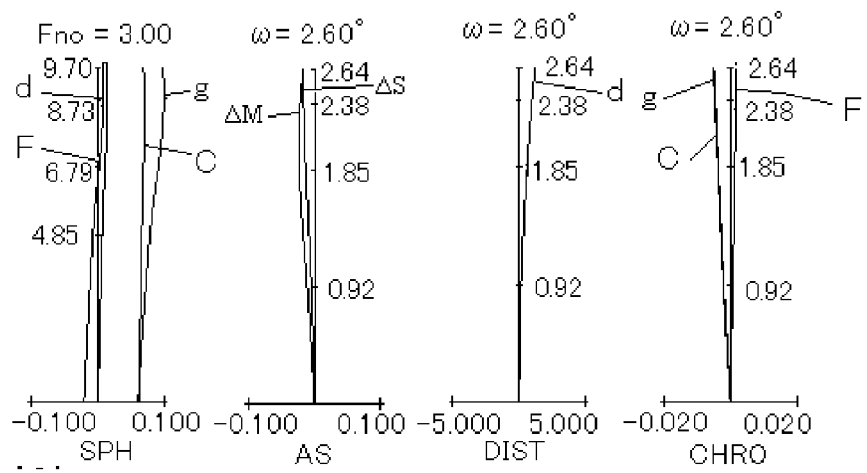
Figure 18D:
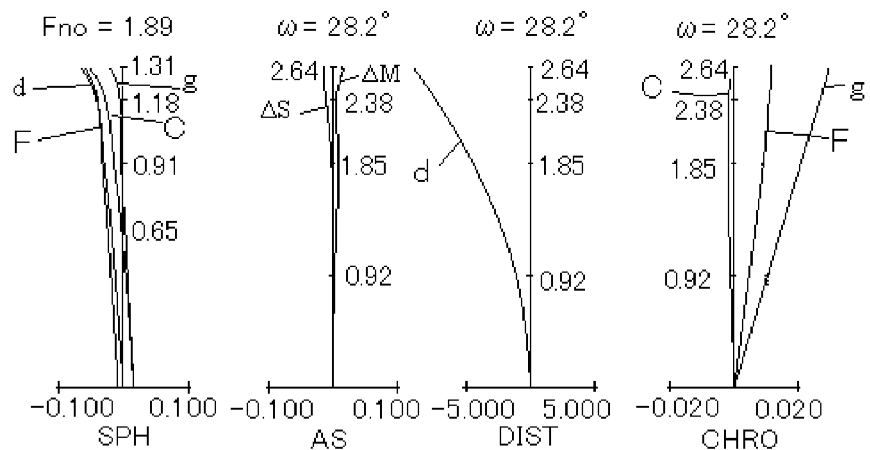
Figure 18E:
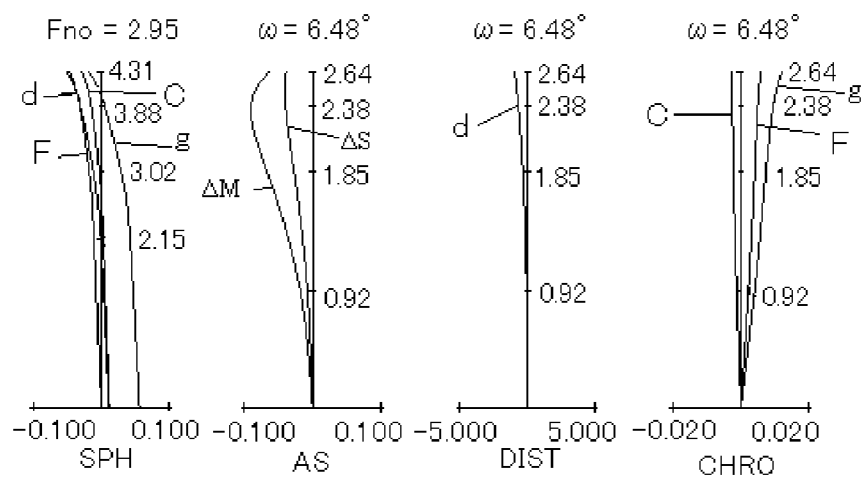
Figure 18F:
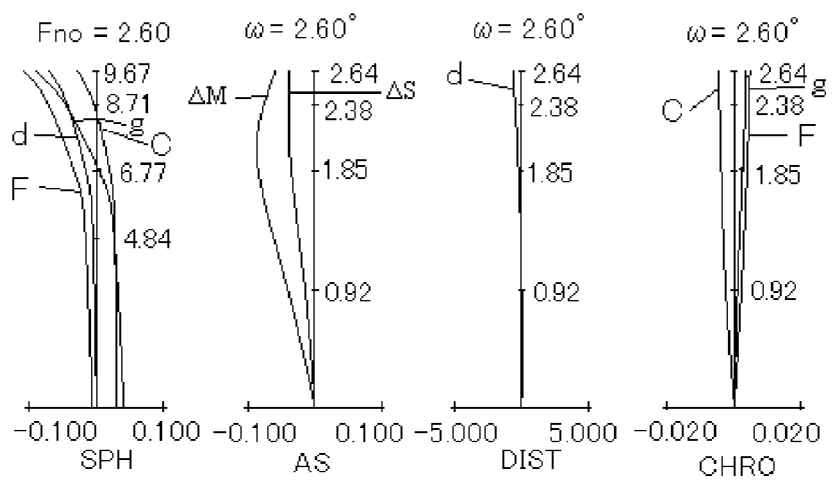

FIGS. 18A, 18B and 18C respectively show aberrations in states where the optical system is focused on an infinite distance object at the wide-angle end, the middle zoom position and the telephoto end. FIGS. 18D, 18E and 18F respectively show aberrations in states where the optical system is focused on a close distance object at the maximum image-forming magnification at the wide-angle end, the middle zoom position and the telephoto end.

[Embodiment 10]

Figure 19A:
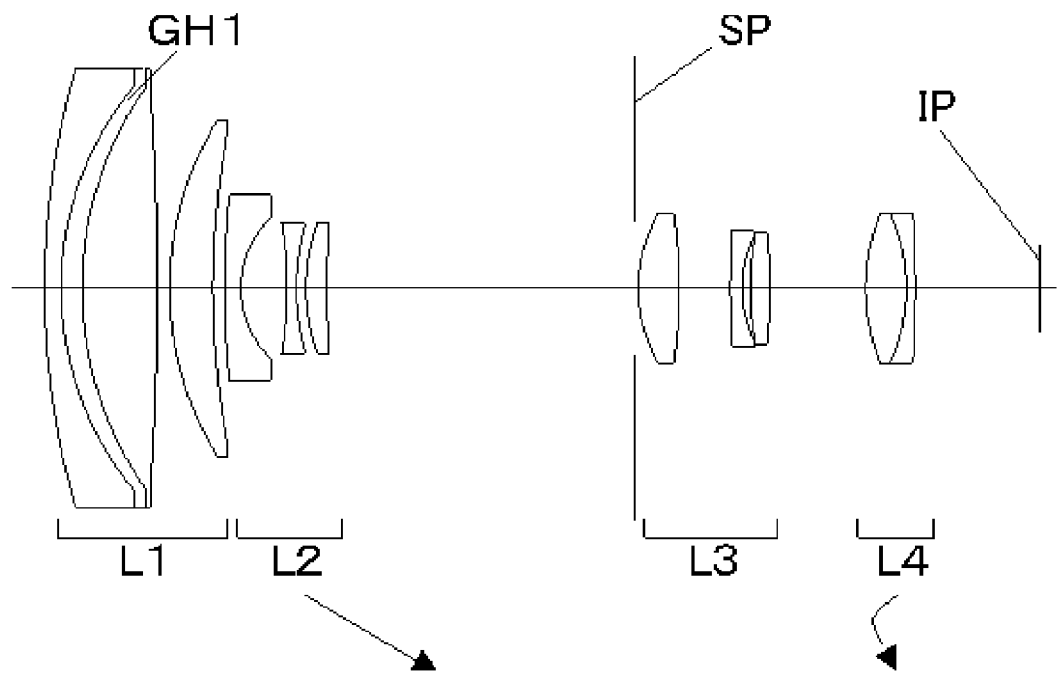
FIGS. 19A and 19B are cross-sectional views showing an optical system of Embodiment 10 of the present invention.
Figure 19B:
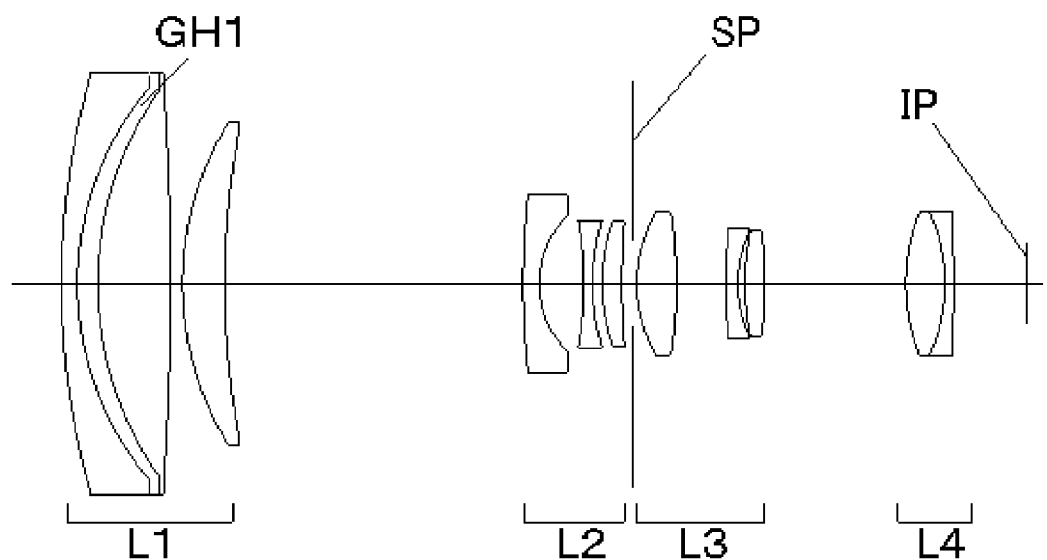

FIGS. 19A and 19B show cross-sections of an optical system that is a tenth embodiment (Embodiment 10) of the present invention. The optical system is a zoom optical system (that is, a zoom lens). FIG. 19A shows the cross-section of the optical system at a wide-angle end, and FIG. 19B shows the cross-section of the optical system at a telephoto end. Arrows in FIG. 19A show movement loci of the second and fifth lens units L2 and L5 during zooming from the wide-angle end to the telephoto end.

The optical system includes, in order from an object side to an image side, a first lens unit L1 having a positive refractive power, a second lens unit L2 having a negative refractive power, an aperture stop SP, a third lens unit L3 having a positive refractive power and a fourth lens unit L4 having a positive refractive power.

During focusing, the first lens unit L1 and the third lens unit L3 are unmoved (fixed) with respect to an image plane IP. Moving the second lens unit L2 to the image side and moving the fourth lens unit L4 from the object side to the image side respectively in an optical axis direction enable focusing from an infinite distance to a close distance.

In this embodiment, the first lens unit L1 disposed further on the object side than the aperture stop SP includes one first optical element GH1. A light-entrance surface and a light-exit surface of the first optical element GH1 are respectively cemented to other optical elements.

Respective numerical values of the optical system of this embodiment satisfy the conditions (1) to (12). A maximum image-forming magnification βmax of the optical system of this embodiment at the wide-angle end is 0.173, and those at a middle zoom position and at the telephoto end are 0.10.

Figure 20A:
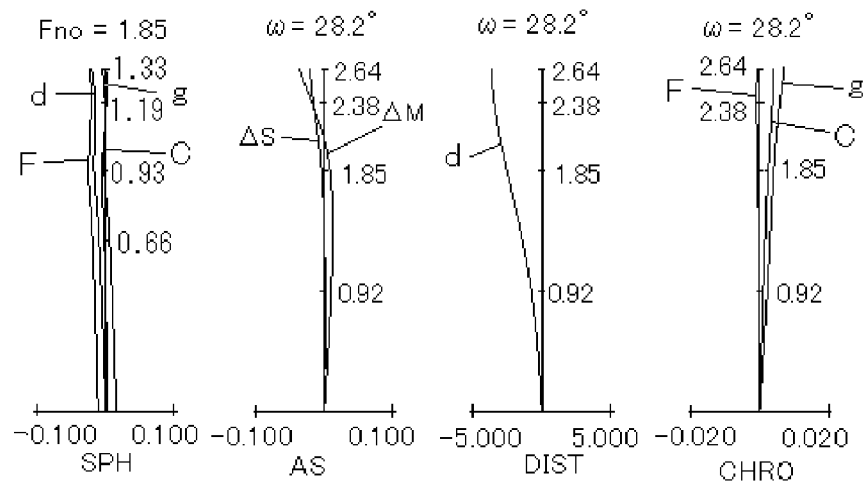
FIGS. 20A, 20B, 20C, 20D, 20E and 20F show aberrations of the optical system of Embodiment 10.
Figure 20B:
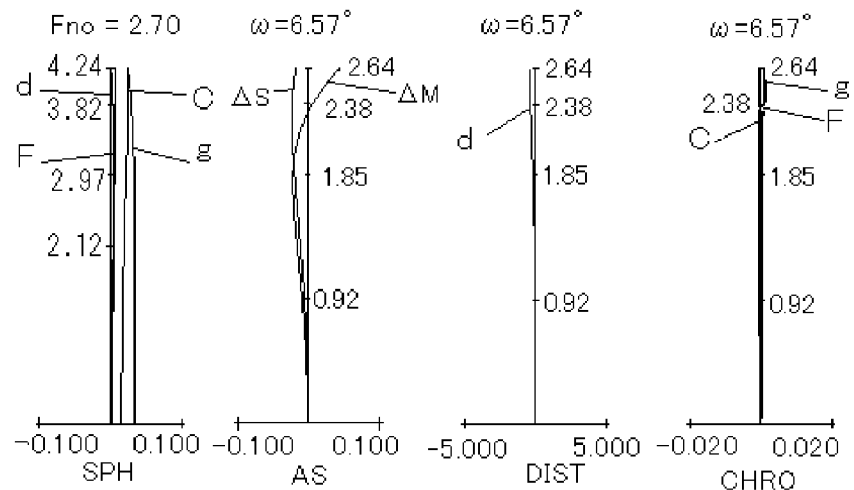
Figure 20C:
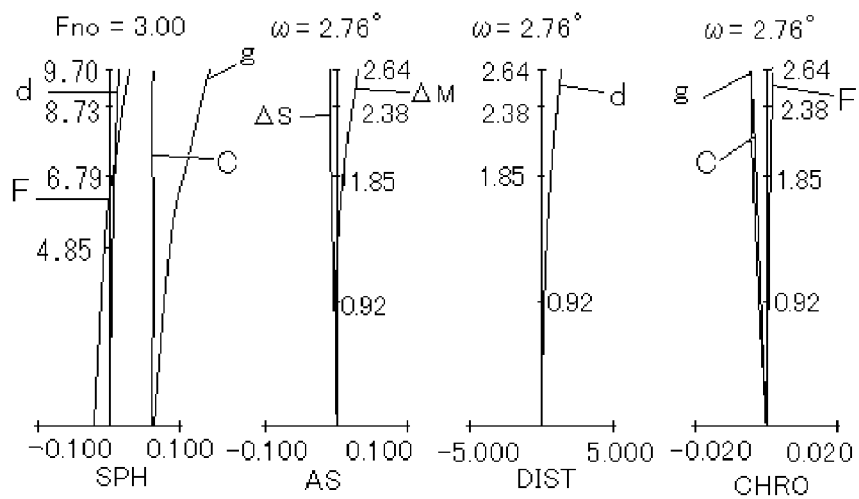
Figure 20D:
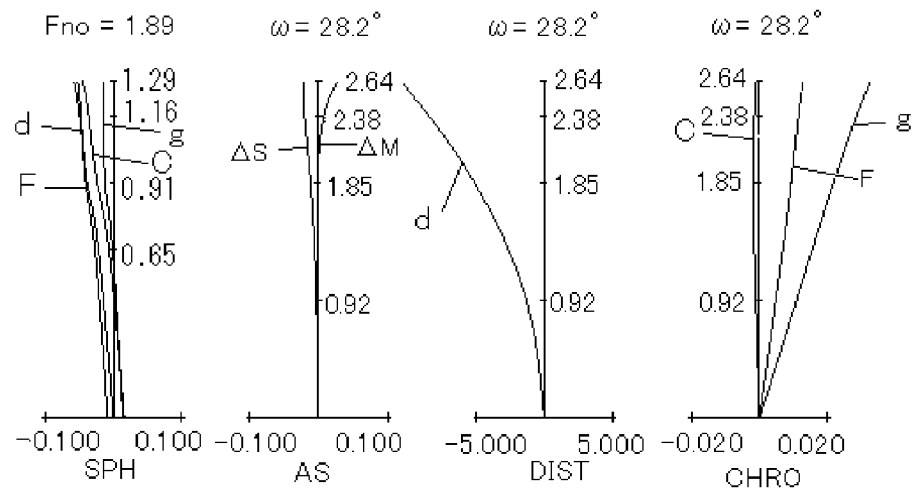
Figure 20E:
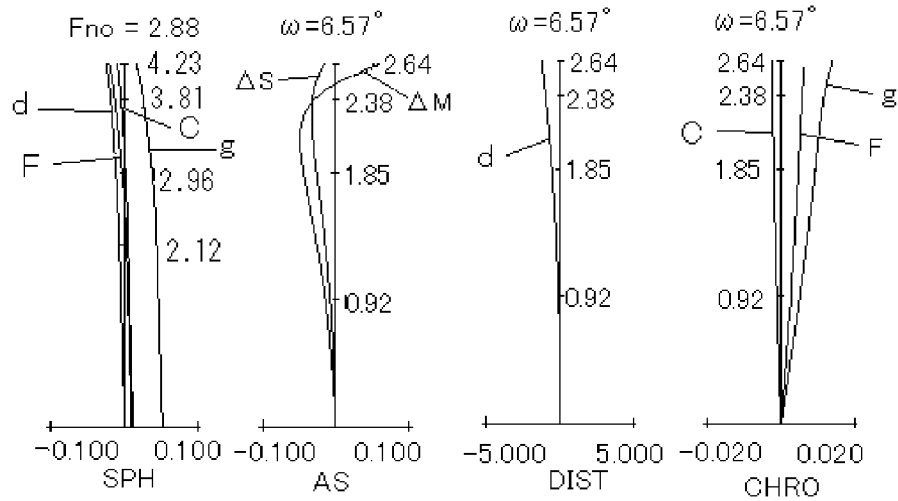
Figure 20F:
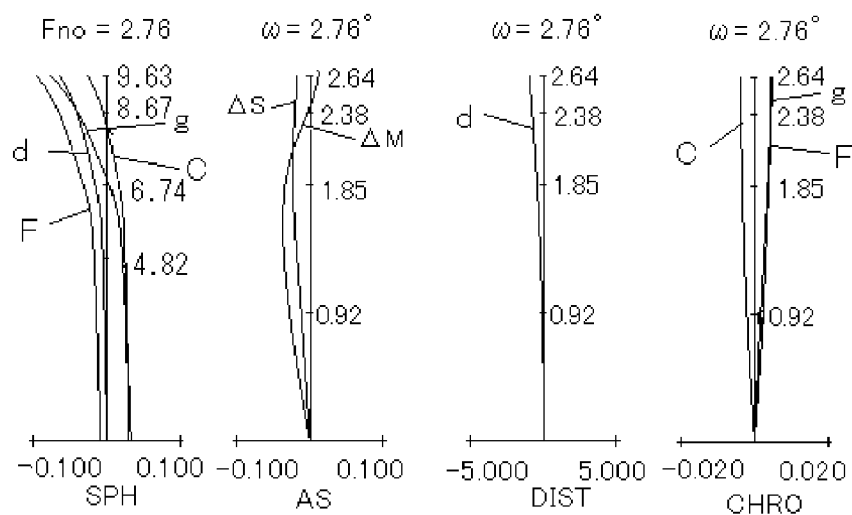

FIGS. 20A, 20B and 20C respectively show aberrations in states where the optical system is focused on an infinite distance object at the wide-angle end, the middle zoom position and the telephoto end. FIGS. 20D, 20E and 20F respectively show aberrations in states where the optical system is focused on a close distance object at the maximum image-forming magnification at the wide-angle end, the middle zoom position and the telephoto end.

NUMERICAL EXAMPLE

Numerical examples respectively corresponding to the above-described embodiments are shown below. In each numerical example, reference character m denotes a surface number or an optical element number counted from a light-entrance side. Rm denotes a curvature radius of an m-th optical surface (hereinafter simply referred to as an "m-th surface"). Dm denotes an axial distance between the m-th surface and a (m+1)-th surface. Nm and υdm respectively denote a refractive index and an Abbe number of an m-th optical element for the d-line. Ng, NF, Nd and NC respectively represent refractive indices for the g-line (435.8 nm), the F-line (486.1 nm), the d-line (587.6 nm) and the C-line (656.3 nm) that are Fraunhofer lines. The Abbe number υd for the d-line, and a partial dispersion ratio for the g- and F-lines are respectively defined as follows:

$$\upsilon d = (Nd-1)/(NF-NC)$$

$$\theta gF = (Ng-NF)/(NF-NC).$$

A shape of an aspherical surface beside which symbol * is added is expressed by the following expression where X represents a shift amount from a vertex of the aspherical surface in a direction of an optical axis (optical axis direction), h represents a height from the optical axis in a direction orthogonal to the optical axis, r represents a paraxial curvature radius, k represents a conic constant, and B, C, D and E represent respective order aspherical surface coefficients.

$$x(h) = \frac{(1/r)h^2}{1+\sqrt{\{1-(1+k)(h/r^2)\}}} + Bh^4 + Ch^6 + Dh^8 + Eh^{10} + \ldots$$

"E±XX" represents "×10$^{\pm XX}$". Fno represents an effective F number, and ω represents a half angle of view whose unit is degree.

Numerical Example 1

Embodiment 1

| SURFACE NO. | R | D | Nd | vd | EFFECTIVE DIAMETER |
|---|---|---|---|---|---|
| 1 | 100.576 | 8.18 | 1.48749 | 70.2 | 51.43 |
| 2 | −110.539 | 10.36 | | | 51.11 |
| 3 | −73.147 | 2.00 | 1.80000 | 29.9 | 46.15 |
| 4 | 221.575 | 1.20 | | | 46.36 |
| 5 | 110.193 | 7.32 | 1.49700 | 81.5 | 46.92 |
| 6 | −89.131 | 0.50 | | | 46.93 |
| 7 | 78.003 | 3.86 | 1.84666 | 23.8 | 45.02 |
| 8 | 296.657 | 0.50 | | | 44.43 |
| 9 | 61.550 | 1.62 | 1.83400 | 37.2 | 42.16 |
| 10 | 30.847 | 8.28 | 1.48749 | 70.2 | 38.94 |
| 11 | 431.727 | (VARIABLE) | | | 38.31 |
| 12 | −419.085 | 1.60 | 1.77250 | 49.6 | 36.40 |
| 13 | 54.622 | 4.69 | | | 34.68 |
| 14 | −96.549 | 1.60 | 1.65160 | 58.5 | 34.65 |
| 15 | 51.384 | 4.43 | 1.84666 | 23.8 | 35.09 |
| 16 | 1016.285 | (VARIABLE) | | | 35.07 |
| 17(STOP) | ∞ | (VARIABLE) | | | 35.16 |
| 18 | 41.749 | 6.24 | 1.71300 | 53.9 | 35.26 |
| 19 | −474.707 | 1.20 | | | 34.50 |
| 20 | 59.897 | 7.05 | 1.49700 | 81.5 | 31.81 |
| 21 | −45.125 | 2.01 | 1.56732 | 42.8 | 30.28 |
| 22 | 24.855 | (VARIABLE) | | | 26.70 |
| 23 | −31.673 | 2.50 | 1.77250 | 49.6 | 30.17 |
| 24 | −38.796 | 5.00 | | | 31.85 |
| 25 | 53.811 | 3.33 | 1.63854 | 55.4 | 35.72 |
| 26 | 93.387 | 64.01 | | | 35.57 |
| IMAGE PLANE | ∞ | | | | |

| VARIOUS DATA | | | |
|---|---|---|---|
| | INFINITY | ×0.5 | ×1.0 |
| FOCAL LENGTH | 180.00 | 180.00 | 180.00 |
| FNO | 3.50 | 4.60 | 5.80 |
| ANGLE OF VIEW | 6.85 | 6.85 | 6.85 |
| IMAGE HEIGHT | 21.64 | 21.64 | 21.64 |
| LENS LENGTH | 225.02 | 225.02 | 225.02 |
| BF | 64.01 | 64.01 | 64.01 |
| D11 | 2.86 | 15.68 | 26.93 |
| D16 | 26.22 | 13.40 | 2.15 |
| D17 | 24.35 | 14.39 | 4.13 |
| D22 | 24.12 | 34.07 | 44.33 |

| LENS UNIT DATA | | | | | |
|---|---|---|---|---|---|
| UNIT | FIRST SURFACE | FOCAL LENGTH | LENS UNIT LENGTH | FRONT PRINCIPAL POINT | REAR PRINCIPAL POINT |
| 1 | 1 | 72.82 | 43.81 | 16.01 | −18.93 |
| 2 | 12 | −49.86 | 12.32 | 1.65 | −7.24 |
| 3 | 18 | 133.67 | 16.50 | −28.11 | −31.96 |
| 4 | 23 | 614.91 | 10.83 | 29.03 | 21.98 |

| LENS ELEMENT DATA | | |
|---|---|---|
| ELEMENT | FIRST SURFACE | FOCAL LENGTH |
| 1 | 1 | 109.41 |
| 2 | 3 | −68.53 |
| 3 | 5 | 100.37 |
| 4 | 7 | 123.99 |
| 5 | 9 | −75.97 |
| 6 | 10 | 67.69 |
| 7 | 12 | −62.46 |
| 8 | 14 | −51.25 |
| 9 | 15 | 63.79 |
| 10 | 18 | 54.09 |
| 11 | 20 | 52.96 |
| 12 | 21 | −27.96 |
| 13 | 23 | −263.71 |
| 14 | 25 | 192.55 |

Numerical Example 2

Embodiment 2

| SURFACE NO. | R | D | Nd | vd | EFFECTIVE DIAMETER |
|---|---|---|---|---|---|
| 1 | 92.537 | 10.45 | 1.48749 | 70.2 | 55.51 |
| 2 | −109.141 | 9.10 | | | 54.51 |
| 3 | −76.295 | 2.00 | 1.79504 | 28.7 | 48.17 |
| 4 | 260.003 | 1.18 | | | 47.89 |
| 5 | 104.768 | 7.37 | 1.48749 | 70.2 | 48.10 |
| 6 | −101.201 | 2.42 | | | 47.92 |
| 7 | 81.140 | 3.40 | 1.92286 | 18.9 | 45.77 |
| 8 | 201.391 | 0.67 | | | 45.30 |
| 9 | 59.871 | 1.92 | 1.90366 | 31.3 | 43.70 |
| 10 | 31.873 | 8.57 | 1.48749 | 70.2 | 40.61 |
| 11 | 263.089 | (VARIABLE) | | | 39.90 |
| 12 | −566.181 | 2.06 | 1.77250 | 49.6 | 34.00 |
| 13 | 50.757 | 5.28 | | | 32.32 |
| 14 | −79.531 | 2.21 | 1.65160 | 58.5 | 32.24 |
| 15 | 60.040 | 4.78 | 1.84666 | 23.8 | 32.92 |
| 16 | −471.920 | (VARIABLE) | | | 33.00 |
| 17(STOP) | ∞ | (VARIABLE) | | | 33.30 |
| 18 | 51.091 | 4.87 | 1.71300 | 53.9 | 33.58 |
| 19 | −251.359 | 0.30 | | | 33.17 |
| 20 | 47.464 | 6.89 | 1.49700 | 81.5 | 31.10 |
| 21 | −53.831 | 2.01 | 1.56732 | 42.8 | 29.73 |
| 22 | 28.508 | (VARIABLE) | | | 27.43 |
| 23 | −43.429 | 2.11 | 1.71700 | 47.9 | 32.56 |
| 24 | −75.505 | 0.53 | | | 33.96 |
| 25 | −64.920 | 2.00 | 1.71700 | 47.9 | 34.03 |
| 26 | −71.657 | 0.25 | | | 34.98 |
| 27 | 48.497 | 3.43 | 1.69680 | 55.5 | 37.53 |
| 28 | 76.999 | 41.38 | | | 37.31 |
| IMAGE PLANE | ∞ | | | | |

-continued

VARIOUS DATA

|  | INFINITY | x0.5 | x1.0 |
|---|---|---|---|
| FOCAL LENGTH | 180.00 | 180.00 | 180.00 |
| FNO | 3.50 | 4.60 | 5.80 |
| ANGLE OF VIEW | 6.85 | 6.85 | 6.85 |
| IMAGE HEIGHT | 21.64 | 21.64 | 21.64 |
| LENS LENGTH | 225.31 | 225.31 | 225.31 |
| BF | 41.38 | 41.38 | 41.38 |
| D11 | 4.63 | 18.38 | 30.84 |
| D16 | 29.35 | 15.60 | 3.13 |
| D17 | 24.67 | 11.59 | 1.50 |
| D22 | 41.48 | 54.57 | 64.66 |

LENS UNIT DATA

| UNIT | FIRST SURFACE | FOCAL LENGTH | LENS UNIT LENGTH |
|---|---|---|---|
| 1 | 1 | 79.18 | 47.08 |
| 2 | 12 | −50.59 | 14.33 |
| 3 | 18 | 103.29 | 14.07 |
| 4 | 23 | −507.60 | 8.32 |

LENS ELEMENT DATA

| ELEMENT | FIRST SURFACE | FOCAL LENGTH |
|---|---|---|
| 1 | 1 | 104.50 |
| 2 | 3 | −74.00 |
| 3 | 5 | 106.85 |
| 4 | 7 | 145.27 |
| 5 | 9 | −77.96 |
| 6 | 10 | 73.50 |
| 7 | 12 | −60.21 |
| 8 | 14 | −52.18 |
| 9 | 15 | 63.17 |
| 10 | 18 | 59.95 |
| 11 | 20 | 51.92 |
| 12 | 21 | −32.56 |
| 13 | 23 | −146.60 |
| 14 | 25 | −1099.61 |
| 15 | 27 | 179.18 |

Numerical Example 3

Embodiment 3

| SURFACE NO. | R | D | Nd | vd | EFFECTIVE DIAMETER |
|---|---|---|---|---|---|
| 1 | 111.997 | 9.43 | 1.48749 | 70.2 | 51.43 |
| 2 | −73.568 | 2.52 | | | 51.14 |
| 3 | −67.743 | 1.99 | 1.80000 | 29.9 | 49.56 |
| 4 | 241.712 | 2.75 | | | 49.76 |
| 5 | 334.450 | 4.54 | 1.80518 | 25.4 | 50.27 |
| 6 | −164.182 | 0.50 | | | 50.35 |
| 7 | 58.789 | 8.26 | 1.49700 | 81.5 | 49.36 |
| 8 | −371.103 | 0.79 | | | 48.79 |
| 9 | 66.071 | 1.99 | 1.80400 | 46.6 | 45.91 |
| 10 | 31.478 | 1.05 | | | 42.25 |
| 11 | 32.198 | 8.68 | 1.48749 | 70.2 | 42.51 |
| 12 | 169.268 | (VARIABLE) | | | 41.78 |
| 13 | −265.243 | 1.60 | 1.72916 | 54.7 | 37.30 |
| 14 | 54.680 | 4.30 | | | 35.72 |
| 15 | −159.871 | 1.60 | 1.62041 | 60.3 | 35.71 |
| 16 | 47.041 | 4.78 | 1.80518 | 25.4 | 36.15 |
| 17 | 505.044 | (VARIABLE) | | | 36.11 |
| 18(STOP) | ∞ | (VARIABLE) | | | 36.61 |
| 19 | 46.610 | 6.11 | 1.71300 | 53.9 | 37.02 |
| 20 | −221.183 | 0.29 | | | 36.50 |
| 21 | 44.068 | 7.79 | 1.49700 | 81.5 | 33.26 |
| 22 | −47.056 | 2.00 | 1.56732 | 42.8 | 31.91 |
| 23 | 24.271 | (VARIABLE) | | | 26.03 |
| 24 | −33.708 | 2.50 | 1.77250 | 49.6 | 28.00 |
| 25 | −186.055 | 5.00 | | | 30.24 |
| 26 | 178.323 | 5.67 | 1.63854 | 55.4 | 34.73 |
| 27 | −57.586 | 59.77 | | | 35.39 |
| IMAGE PLANE | ∞ | | | | |

VARIOUS DATA

|  | INFINITY | x0.5 | x1.0 |
|---|---|---|---|
| FOCAL LENGTH | 180.00 | 180.00 | 180.00 |
| FNO | 3.50 | 4.60 | 5.80 |
| ANGLE OF VIEW | 6.85 | 6.85 | 6.85 |
| IMAGE HEIGHT | 21.64 | 21.64 | 21.64 |
| LENS LENGTH | 225.02 | 225.02 | 225.02 |
| BF | 59.77 | 59.77 | 59.77 |
| D12 | 4.60 | 19.25 | 32.14 |
| D17 | 29.87 | 15.22 | 2.33 |
| D18 | 20.17 | 10.69 | 1.50 |
| D23 | 26.46 | 35.94 | 45.13 |

LENS UNIT DATA

| UNIT | FIRST SURFACE | FOCAL LENGTH | LENS UNIT LENGTH |
|---|---|---|---|
| 1 | 1 | 80.83 | 42.50 |
| 2 | 13 | −56.19 | 12.28 |
| 3 | 19 | 98.56 | 16.20 |
| 4 | 24 | −640.94 | 13.17 |

LENS ELEMENT DATA

| ELEMENT | FIRST SURFACE | FOCAL LENGTH |
|---|---|---|
| 1 | 1 | 92.62 |
| 2 | 3 | −65.95 |
| 3 | 5 | 137.33 |
| 4 | 7 | 102.77 |
| 5 | 9 | −76.75 |
| 6 | 11 | 79.90 |
| 7 | 13 | −62.04 |
| 8 | 15 | −58.41 |
| 9 | 16 | 64.12 |
| 10 | 19 | 54.51 |
| 11 | 21 | 47.13 |
| 12 | 22 | −27.94 |
| 13 | 24 | −53.67 |
| 14 | 26 | 68.81 |

Numerical Example 4

Embodiment 4

| SURFACE NO. | R | D | Nd | vd | EFFECTIVE DIAMETER |
|---|---|---|---|---|---|
| 1 | 105.249 | 10.66 | 1.48749 | 70.2 | 58.05 |
| 2 | −94.404 | 6.82 | | | 57.24 |
| 3 | −71.045 | 1.79 | 1.80000 | 29.9 | 50.34 |
| 4 | 250.120 | 0.98 | | | 49.65 |
| 5 | 107.986 | 7.68 | 1.49700 | 81.5 | 50.26 |
| 6 | −96.337 | 0.49 | | | 50.25 |
| 7 | 97.563 | 3.81 | 1.80809 | 22.8 | 48.23 |
| 8 | 621.370 | 0.49 | | | 47.75 |
| 9 | 58.047 | 1.55 | 1.83400 | 37.2 | 44.76 |
| 10 | 31.597 | 8.62 | 1.48749 | 70.2 | 41.26 |
| 11 | 324.686 | (VARIABLE) | | | 40.40 |
| 12 | −369.623 | 1.49 | 1.77250 | 49.6 | 38.82 |
| 13 | 57.868 | 4.94 | | | 37.00 |
| 14 | −107.391 | 1.50 | 1.71300 | 53.9 | 36.96 |
| 15 | 51.593 | 5.01 | 1.84666 | 23.8 | 37.42 |

-continued

| | | | | | |
|---|---|---|---|---|---|
| 16 | −1845.997 | (VARIABLE) | | | 37.43 |
| 17 | −1161.507 | 3.00 | 1.77250 | 49.6 | 37.36 |
| 18 | −90.346 | 1.49 | 1.54072 | 47.2 | 37.37 |
| 19 | 431.492 | (VARIABLE) | | | 37.19 |
| 20 (STOP) | ∞ | (VARIABLE) | | | 37.16 |
| 21 | 40.941 | 6.55 | 1.71300 | 53.9 | 36.47 |
| 22 | −386.255 | 0.29 | | | 35.70 |
| 23 | 47.638 | 7.22 | 1.49700 | 81.5 | 32.69 |
| 24 | −48.867 | 2.00 | 1.57501 | 41.5 | 31.28 |
| 25 | 22.858 | (VARIABLE) | | | 26.66 |
| 26 | −31.828 | 1.95 | 1.77250 | 49.6 | 30.13 |
| 27 | −41.133 | 0.25 | | | 31.66 |
| 28 | 41.075 | 3.15 | 1.67790 | 55.3 | 34.70 |
| 29 | 57.227 | (VARIABLE) | | | 34.42 |
| IMAGE PLANE | ∞ | | | | |

VARIOUS DATA

| | INFINITY | x0.5 | x1.0 |
|---|---|---|---|
| FOCAL LENGTH | 150.00 | 150.00 | 150.00 |
| FNO | 2.80 | 4.00 | 5.00 |
| ANGLE OF VIEW | 8.21 | 8.21 | 8.21 |
| IMAGE HEIGHT | 21.64 | 21.64 | 21.64 |
| LENS LENGTH | 206.53 | 206.53 | 206.53 |
| BF | 49.00 | 49.00 | 49.00 |
| D12 | 3.18 | 18.39 | 32.27 |
| D16 | 30.13 | 14.92 | 1.04 |
| D19 | 1.19 | 1.19 | 1.19 |
| D20 | 19.41 | 10.16 | 1.49 |
| D25 | 21.86 | 31.11 | 39.77 |

LENS UNIT DATA

| UNIT | FIRST SURFACE | FOCAL LENGTH | LENS UNIT LENGTH |
|---|---|---|---|
| 1 | 1 | 72.76 | 42.91 |
| 2 | 12 | −51.52 | 12.94 |
| 3 | 17 | 1536.05 | 4.49 |
| 4 | 21 | 116.31 | 16.06 |
| 5 | 26 | 14916.35 | 5.35 |

LENS ELEMENT DATA

| ELEMENT | FIRST SURFACE | FOCAL LENGTH |
|---|---|---|
| 1 | 1 | 103.90 |
| 2 | 3 | −68.99 |
| 3 | 5 | 103.74 |
| 4 | 7 | 142.76 |
| 5 | 9 | −85.42 |
| 6 | 10 | 71.12 |
| 7 | 12 | −64.67 |
| 8 | 14 | −48.69 |
| 9 | 15 | 59.35 |
| 10 | 17 | 126.66 |
| 11 | 18 | −138.02 |
| 12 | 21 | 52.25 |
| 13 | 23 | 49.77 |
| 14 | 24 | −26.81 |
| 15 | 26 | −200.49 |
| 16 | 28 | 199.01 |

Numerical Example 5

Embodiment 5

| SURFACE NO. | R | D | Nd | vd | EFFECTIVE DIAMETER |
|---|---|---|---|---|---|
| 1 | 173.868 | 7.98 | 1.48749 | 70.2 | 51.40 |
| 2 | −76.348 | 4.79 | | | 50.87 |

-continued

| | | | | | |
|---|---|---|---|---|---|
| 3 | −63.297 | 1.80 | 1.80610 | 33.3 | 46.29 |
| 4 | 358.013 | 1.00 | | | 46.50 |
| 5 | 120.926 | 7.44 | 1.49700 | 81.5 | 47.21 |
| 6 | −87.964 | 0.50 | | | 47.31 |
| 7 | 155.327 | 3.15 | 1.85026 | 32.3 | 47.22 |
| 8 | −2968.645 | 0.50 | | | 47.06 |
| 9 | 54.599 | 1.39 | 1.83481 | 42.7 | 45.61 |
| 10 | 34.370 | 8.79 | 1.48749 | 70.2 | 43.36 |
| 11 | 451.321 | (VARIABLE) | | | 42.84 |
| 12 | −209.457 | 1.50 | 1.77250 | 49.6 | 38.21 |
| 13 | 55.859 | 5.21 | | | 36.64 |
| 14 | −92.666 | 2.20 | 1.65160 | 58.5 | 36.64 |
| 15 | 61.676 | 4.85 | 1.84666 | 23.8 | 37.83 |
| 16 | −389.649 | (VARIABLE) | | | 37.95 |
| 17 | 634.438 | 3.41 | 1.60311 | 60.6 | 40.04 |
| 18 | −107.021 | (VARIABLE) | | | 40.07 |
| 19 (STOP) | ∞ | (VARIABLE) | | | 39.48 |
| 20 | −393.543 | 1.50 | 1.53172 | 48.8 | 39.28 |
| 21 | 187.526 | (VARIABLE) | | | 38.99 |
| 22 | 47.021 | 6.21 | 1.72916 | 54.7 | 38.11 |
| 23 | −266.925 | 0.28 | | | 37.53 |
| 24 | 49.196 | 7.61 | 1.49700 | 81.5 | 34.21 |
| 25 | −49.302 | 1.60 | 1.56732 | 42.8 | 32.82 |
| 26 | 25.280 | (VARIABLE) | | | 28.43 |
| 27 | −37.909 | 1.60 | 1.60342 | 38.0 | 31.27 |
| 28 | −76.830 | 0.25 | | | 32.66 |
| 29 | 44.101 | 3.16 | 1.72916 | 54.7 | 35.09 |
| 30 | 63.337 | 46.50 | | | 34.83 |
| IMAGE PLANE | ∞ | | | | |

VARIOUS DATA

| | INFINITY | x0.5 | x1.0 |
|---|---|---|---|
| FOCAL LENGTH | 135.00 | 135.00 | 135.00 |
| FNO | 2.80 | 3.80 | 4.80 |
| ANGLE OF VIEW | 9.10 | 9.10 | 9.10 |
| IMAGE HEIGHT | 21.64 | 21.64 | 21.64 |
| LENS LENGTH | 205.00 | 205.00 | 205.00 |
| BF | 46.50 | 46.50 | 46.50 |
| D11 | 3.60 | 18.72 | 32.66 |
| D16 | 30.06 | 14.94 | 1.00 |
| D18 | 0.99 | 0.99 | 0.99 |
| D19 | 1.49 | 1.49 | 1.49 |
| D21 | 20.33 | 9.50 | 0.99 |
| D26 | 25.34 | 36.17 | 44.68 |

LENS UNIT DATA

| UNIT | FIRST SURFACE | FOCAL LENGTH | LENS UNIT LENGTH |
|---|---|---|---|
| 1 | 1 | 72.04 | 37.33 |
| 2 | 12 | −52.32 | 13.76 |
| 3 | 17 | 152.10 | 3.41 |
| 4 | 20 | −238.65 | 1.50 |
| 5 | 22 | 109.79 | 15.69 |
| 6 | 27 | −378.60 | 5.01 |

LENS ELEMENT DATA

| ELEMENT | FIRST SURFACE | FOCAL LENGTH |
|---|---|---|
| 1 | 1 | 109.98 |
| 2 | 3 | −66.60 |
| 3 | 5 | 103.69 |
| 4 | 7 | 173.68 |
| 5 | 9 | −114.71 |
| 6 | 10 | 75.79 |
| 7 | 12 | −56.95 |
| 8 | 14 | −56.51 |
| 9 | 15 | 63.20 |
| 10 | 17 | 152.10 |
| 11 | 20 | −238.65 |
| 12 | 22 | 55.29 |
| 13 | 24 | 50.85 |
| 14 | 25 | −29.23 |

Numerical Example 6

Embodiment 6

| SURFACE NO. | R | D | Nd | vd | EFFECTIVE DIAMETER |
|---|---|---|---|---|---|
| 1 | 195.488 | 7.75 | 1.48749 | 70.2 | 50.93 |
| 2 | −74.609 | 5.03 | | | 50.41 |
| 3 | −61.101 | 1.80 | 1.80100 | 35.0 | 45.83 |
| 4 | 306.679 | 1.32 | | | 46.62 |
| 5 | 119.833 | 7.31 | 1.49700 | 81.5 | 47.53 |
| 6 | −82.715 | 0.49 | | | 47.64 |
| 7 | 125.341 | 3.48 | 1.74950 | 35.3 | 46.58 |
| 8 | −5142.737 | 0.49 | | | 46.40 |
| 9 | 56.007 | 1.39 | 1.83481 | 42.7 | 45.05 |
| 10 | 34.363 | 8.77 | 1.48749 | 70.2 | 42.85 |
| 11 | 760.172 | (VARIABLE) | | | 42.36 |
| 12 | −219.686 | 1.49 | 1.77250 | 49.6 | 38.75 |
| 13 | 58.523 | 5.02 | | | 37.18 |
| 14 | −102.231 | 2.20 | 1.65160 | 58.5 | 37.18 |
| 15 | 60.965 | 4.81 | 1.84666 | 23.8 | 38.18 |
| 16 | −546.173 | (VARIABLE) | | | 38.25 |
| 17 | −3134.020 | 2.90 | 1.63854 | 55.4 | 39.59 |
| 18 | −112.421 | (VARIABLE) | | | 39.63 |
| 19 (STOP) | ∞ | (VARIABLE) | | | 39.14 |
| 20 | −781.481 | 1.49 | 1.53172 | 48.8 | 38.97 |
| 21 | 167.387 | (VARIABLE) | | | 38.68 |
| 22 | 46.777 | 6.18 | 1.72916 | 54.7 | 38.01 |
| 23 | −270.493 | 0.27 | | | 37.44 |
| 24 | 47.646 | 7.63 | 1.49700 | 81.5 | 34.11 |
| 25 | −49.702 | 1.60 | 1.56732 | 42.8 | 32.75 |
| 26 | 25.053 | (VARIABLE) | | | 28.69 |
| 27 | −38.414 | 1.60 | 1.60342 | 38.0 | 31.57 |
| 28 | −76.024 | 0.25 | | | 32.94 |
| 29 | 42.858 | 3.14 | 1.72916 | 54.7 | 35.43 |
| 30 | 59.608 | 46.01 | | | 35.13 |
| IMAGE PLANE | ∞ | | | | |

VARIOUS DATA

| | INFINITY | x0.5 | x1.0 |
|---|---|---|---|
| FOCAL LENGTH | 135.00 | 135.00 | 135.00 |
| FNO | 2.80 | 3.80 | 4.80 |
| ANGLE OF VIEW | 9.10 | 9.10 | 9.10 |
| IMAGE HEIGHT | 21.64 | 21.64 | 21.64 |
| LENS LENGTH | 204.97 | 204.97 | 204.97 |
| BF | 46.01 | 46.01 | 46.01 |
| D11 | 3.31 | 18.38 | 32.13 |
| D16 | 29.82 | 14.75 | 1.00 |
| D18 | 0.99 | 0.99 | 0.99 |
| D19 | 1.24 | 1.24 | 1.24 |
| D21 | 21.46 | 10.40 | 0.99 |
| D26 | 25.70 | 36.76 | 46.17 |

LENS UNIT DATA

| UNIT | FIRST SURFACE | FOCAL LENGTH | LENS UNIT LENGTH |
|---|---|---|---|
| 1 | 1 | 72.02 | 37.85 |
| 2 | 12 | −54.68 | 13.53 |
| 3 | 17 | 182.54 | 2.90 |
| 4 | 20 | −259.13 | 1.49 |
| 5 | 22 | 106.64 | 15.68 |
| 6 | 27 | −389.46 | 4.99 |

| 15 | 27 | −125.96 |
| 16 | 29 | 186.25 |

LENS ELEMENT DATA

| ELEMENT | FIRST SURFACE | FOCAL LENGTH |
|---|---|---|
| 1 | 1 | 111.82 |
| 2 | 3 | −63.47 |
| 3 | 5 | 99.66 |
| 4 | 7 | 163.30 |
| 5 | 9 | −109.72 |
| 6 | 10 | 73.53 |
| 7 | 12 | −59.68 |
| 8 | 14 | −58.30 |
| 9 | 15 | 65.01 |
| 10 | 17 | 182.54 |
| 11 | 20 | −259.13 |
| 12 | 22 | 55.15 |
| 13 | 24 | 50.25 |
| 14 | 25 | −29.14 |
| 15 | 27 | −130.77 |
| 16 | 29 | 193.85 |

Numerical Example 7

Embodiment 7

| SURFACE NO. | R | D | Nd | vd | EFFECTIVE DIAMETER |
|---|---|---|---|---|---|
| 1 | 211.789 | 7.87 | 1.48749 | 70.2 | 50.42 |
| 2 | −69.054 | 3.69 | | | 49.92 |
| 3 | −59.507 | 1.80 | 1.80100 | 35.0 | 46.36 |
| 4 | 268.607 | 1.00 | | | 47.22 |
| 5 | 118.029 | 7.52 | 1.49700 | 81.5 | 48.08 |
| 6 | −81.790 | 0.49 | | | 48.21 |
| 7 | 108.264 | 3.82 | 1.71736 | 29.5 | 47.06 |
| 8 | 36766.973 | 0.50 | | | 46.71 |
| 9 | 56.536 | 1.65 | 1.83400 | 37.2 | 45.16 |
| 10 | 34.096 | 8.77 | 1.48749 | 70.2 | 42.76 |
| 11 | 609.617 | (VARIABLE) | | | 42.26 |
| 12 | −223.964 | 1.49 | 1.77250 | 49.6 | 38.93 |
| 13 | 58.252 | 4.87 | | | 37.35 |
| 14 | −117.380 | 2.20 | 1.65160 | 58.5 | 37.35 |
| 15 | 57.743 | 4.84 | 1.84666 | 23.8 | 38.22 |
| 16 | −1008.969 | (VARIABLE) | | | 38.27 |
| 17 | −973.220 | 2.74 | 1.63854 | 55.4 | 39.35 |
| 18 | −112.404 | (VARIABLE) | | | 39.39 |
| 19 (STOP) | ∞ | (VARIABLE) | | | 38.94 |
| 20 | −602.590 | 1.49 | 1.53172 | 48.8 | 38.77 |
| 21 | 180.195 | (VARIABLE) | | | 38.53 |
| 22 | 46.644 | 6.25 | 1.72916 | 54.7 | 38.09 |
| 23 | −260.864 | 0.27 | | | 37.51 |
| 24 | 46.599 | 7.76 | 1.49700 | 81.5 | 34.11 |
| 25 | −49.232 | 1.65 | 1.56732 | 42.8 | 32.71 |
| 26 | 24.734 | (VARIABLE) | | | 28.54 |
| 27 | −37.691 | 1.60 | 1.60342 | 38.0 | 31.36 |
| 28 | −71.648 | 0.25 | | | 32.73 |
| 29 | 41.962 | 3.09 | 1.72916 | 54.7 | 35.25 |
| 30 | 56.928 | 46.35 | | | 34.93 |
| IMAGE PLANE | ∞ | | | | |

VARIOUS DATA

| | INFINITY | x0.5 | x1.0 |
|---|---|---|---|
| FOCAL LENGTH | 135.00 | 135.00 | 135.00 |
| FNO | 2.80 | 3.80 | 4.80 |
| ANGLE OF VIEW | 9.10 | 9.10 | 9.10 |
| IMAGE HEIGHT | 21.64 | 21.64 | 21.64 |
| LENS LENGTH | 203.69 | 203.69 | 203.69 |
| BF | 46.35 | 46.35 | 46.35 |
| D11 | 3.44 | 18.57 | 32.43 |
| D16 | 29.99 | 14.85 | 1.00 |

| | | | |
|---|---|---|---|
| D18 | 0.99 | 0.99 | 0.99 |
| D19 | 1.30 | 1.30 | 1.30 |
| D21 | 20.91 | 10.15 | 0.99 |
| D26 | 25.09 | 35.84 | 45.00 |

LENS UNIT DATA

| UNIT | FIRST SURFACE | FOCAL LENGTH | LENS UNIT LENGTH |
|---|---|---|---|
| 1 | 1 | 71.98 | 37.12 |
| 2 | 12 | −55.48 | 13.40 |
| 3 | 17 | 198.77 | 2.74 |
| 4 | 20 | −260.71 | 1.49 |
| 5 | 22 | 103.73 | 15.93 |
| 6 | 27 | −389.16 | 4.94 |

LENS ELEMENT DATA

| ELEMENT | FIRST SURFACE | FOCAL LENGTH |
|---|---|---|
| 1 | 1 | 107.81 |
| 2 | 3 | −60.67 |
| 3 | 5 | 98.44 |
| 4 | 7 | 151.36 |
| 5 | 9 | −106.57 |
| 6 | 10 | 73.72 |
| 7 | 12 | −59.70 |
| 8 | 14 | −59.10 |
| 9 | 15 | 64.64 |
| 10 | 17 | 198.77 |
| 11 | 20 | −260.71 |
| 12 | 22 | 54.74 |
| 13 | 24 | 49.50 |
| 14 | 25 | −28.79 |
| 15 | 27 | −134.17 |
| 16 | 29 | 201.36 |

Numerical Example 8

Embodiment 8

| SURFACE NO. | R | D | Nd | vd | EFFECTIVE DIAMETER |
|---|---|---|---|---|---|
| 1 | 47.133 | 1.39 | 1.69350 | 53.2 | 38.94 |
| 2 | 26.771 | 6.79 | | | 35.84 |
| 3 | 123.853 | 3.34 | 1.80610 | 40.9 | 35.65 |
| 4 | −187.164 | 0.39 | | | 35.39 |
| 5 | 45.014 | 0.74 | 1.84666 | 23.8 | 32.92 |
| 6 | 27.353 | 7.39 | 1.72916 | 54.7 | 31.24 |
| 7 | −83.067 | 1.14 | | | 30.57 |
| 8 | −107.883 | 0.73 | 1.72047 | 34.7 | 27.39 |
| 9 | 42.976 | 0.00 | | | 24.95 |
| 10 | 42.976 | 1.76 | 1.84666 | 23.8 | 24.95 |
| 11 | 116.073 | 1.86 | | | 24.56 |
| 12 | −337.329 | 1.00 | 1.84666 | 23.8 | 23.36 |
| 13 | −309.249 | (VARIABLE) | | | 22.94 |
| 14 | −252.840 | 1.23 | 1.80400 | 46.6 | 21.97 |
| 15 | 33.677 | 4.14 | | | 21.81 |
| 16 | −28.209 | 1.25 | 1.64769 | 33.8 | 21.87 |
| 17 | 36.175 | 6.53 | 1.85026 | 32.3 | 25.53 |
| 18 | −31.782 | (VARIABLE) | | | 26.16 |
| 19 (STOP) | ∞ | (VARIABLE) | | | 26.54 |
| 20 | 86.014 | 4.77 | 1.65160 | 58.5 | 30.52 |
| 21 | −50.917 | 0.13 | | | 30.75 |
| 22 | 72.983 | 5.90 | 1.63854 | 55.4 | 30.62 |
| 23 | −37.418 | 1.98 | 1.84666 | 23.8 | 30.42 |
| 24 | 1317.513 | (VARIABLE) | | | 30.10 |
| 25 | −131.534 | 1.10 | 1.72916 | 54.7 | 29.99 |
| 26 | 24.139 | 3.52 | 1.75520 | 27.5 | 30.30 |
| 27 | 35.111 | 3.53 | | | 30.33 |
| 28 | 39.172 | 4.83 | 1.58313 | 59.4 | 34.04 |
| 29 | 465.119 | (VARIABLE) | | | 34.19 |
| IMAGE PLANE | ∞ | | | | |

VARIOUS DATA

| | INFINITY | x0.5 | x1.0 |
|---|---|---|---|
| FOCAL LENGTH | 65.00 | 65.00 | 65.00 |
| FNO | 2.90 | 3.05 | 3.96 |
| ANGLE OF VIEW | 18.41 | 18.41 | 18.41 |
| IMAGE HEIGHT | 21.64 | 21.64 | 21.64 |
| LENS LENGTH | 145.08 | 145.08 | 145.08 |
| BF | 38.20 | 47.63 | 37.80 |
| D13 | 1.14 | 6.33 | 13.24 |
| D18 | 14.18 | 1.50 | 1.00 |
| D19 | 23.98 | 14.50 | 1.00 |
| D24 | 2.15 | 9.64 | 26.71 |
| D29 | 38.20 | 47.63 | 37.80 |

LENS UNIT DATA

| UNIT | FIRST SURFACE | FOCAL LENGTH | LENS UNIT LENGTH | FRONT PRINCIPAL POINT | REAR RINCIPAL POINT |
|---|---|---|---|---|---|
| 1 | 1 | 68.34 | 26.53 | 11.80 | −6.72 |
| 2 | 14 | −91.07 | 13.15 | −14.65 | −28.91 |
| 3 | 19 | ∞ | 0.00 | 0.00 | −0.00 |
| 4 | 20 | 43.05 | 12.78 | 0.99 | −6.59 |
| 5 | 25 | −89.19 | 12.97 | −2.41 | −12.03 |

LENS ELEMENT DATA

| ELEMENT | FIRST SURFACE | FOCAL LENGTH |
|---|---|---|
| 1 | 1 | −91.92 |
| 2 | 3 | 92.91 |
| 3 | 5 | −83.96 |
| 4 | 6 | 29.04 |
| 5 | 8 | −42.57 |
| 6 | 10 | 79.72 |
| 7 | 12 | 4317.40 |
| 8 | 14 | −36.89 |
| 9 | 16 | −24.29 |
| 10 | 17 | 20.82 |
| 11 | 20 | 49.77 |
| 12 | 22 | 39.56 |
| 13 | 23 | −42.95 |
| 14 | 25 | −27.89 |
| 15 | 26 | 89.88 |
| 16 | 28 | 73.05 |

Numerical Example 9

Embodiment 9

| SURFACE NO. | R | D | Nd | vd | FFECTIVE DIAMETER |
|---|---|---|---|---|---|
| 1 | 47.672 | 1.00 | 1.84666 | 23.9 | 22.16 |
| 2 | 17.695 | 1.37 | 1.92286 | 18.9 | 21.33 |
| 3 | 20.153 | 4.24 | 1.60311 | 60.6 | 21.13 |
| 4 | −193.063 | 0.12 | | | 21.05 |
| 5 | 18.985 | 2.60 | 1.67790 | 55.3 | 20.39 |
| 6 | 57.724 | (VARIABLE) | | | 20.08 |
| 7 | 60.132 | 0.88 | 1.88300 | 40.8 | 9.67 |
| 8 | 5.891 | 1.97 | | | 7.60 |
| 9 | −25.986 | 0.65 | 1.71300 | 53.9 | 7.44 |
| 10 | 11.746 | 1.00 | | | 7.21 |
| 11 | 11.317 | 1.26 | 1.92286 | 18.9 | 7.41 |
| 12 | 41.215 | (VARIABLE) | | | 7.23 |
| 13* | 8.624 | 2.59 | 1.58313 | 59.4 | 8.69 |
| 14 | −36.192 | 1.39 | | | 8.44 |

-continued

| | | | | | |
|---|---|---|---|---|---|
| 15 (STOP) | ∞ | 1.70 | | | 7.67 |
| 16 | 93.114 | 1.00 | 1.76182 | 26.5 | 6.85 |
| 17 | 8.094 | 0.43 | | | 6.38 |
| 18* | 15.527 | 1.64 | 1.58313 | 59.4 | 6.39 |
| 19 | −46.596 | (VARIABLE) | | | 6.30 |
| 20 | 12.916 | 2.20 | 1.81600 | 46.6 | 7.64 |
| 21 | −12.051 | 1.00 | 1.84666 | 23.9 | 7.51 |
| 22 | −102.309 | (VARIABLE) | | | 7.34 |
| IMAGE PLANE | ∞ | | | | |

ASPHERICAL SURFACE DATA

SURFACE 13

κ = 5.31511e−001      A4 = −3.19846e−004
A6 = −1.98852e−006    A8 = −9.80127e−008

SURFACE 18

κ = −1.73310e+000     A4 = 2.61413e−005
A6 = −5.39292e−006    A8 = 3.65920e−007

VARIOUS DATA
ZOOM RATIO 11.83

| | WIDE-ANGLE | | MIDDLE | | TELEPHOTO | |
|---|---|---|---|---|---|---|
| | INFINITY | x0.186 | INFINITY | x0.10 | INFINITY | x0.10 |
| FOCAL LENGTH | 4.92 | 4.92 | 23.24 | 23.24 | 58.20 | 58.20 |
| FNO | 1.85 | 1.89 | 2.70 | 2.95 | 3.00 | 3.04 |
| ANGLE OF VIEW | 28.22 | 28.22 | 6.48 | 6.48 | 2.60 | 2.60 |
| IMAGE HEIGHT | 2.64 | 2.64 | 2.64 | 2.64 | 2.64 | 2.64 |
| LENS LENGTH | 59.76 | 59.76 | 59.76 | 59.76 | 59.76 | 59.76 |
| BF | 7.63 | 8.66 | 10.66 | 12.99 | 4.85 | 11.14 |
| D6 | 0.70 | 0.70 | 14.29 | 14.29 | 18.58 | 18.58 |
| D12 | 18.59 | 18.59 | 5.00 | 5.00 | 0.71 | 0.71 |
| D19 | 5.81 | 4.79 | 2.78 | 0.45 | 8.60 | 2.31 |
| D22 | 7.63 | 8.66 | 10.66 | 12.99 | 4.85 | 11.14 |

LENS UNIT DATA

| UNIT | FIRST SURFACE | FOCAL LENGTH | LENS UNIT LENGTH | FRONT PRINCIPAL POINT | REAR PRINCIPAL POINT |
|---|---|---|---|---|---|
| 1 | 1 | 30.07 | 9.33 | 2.30 | −3.35 |
| 2 | 7 | −6.34 | 5.76 | 0.52 | −4.11 |
| 3 | 13 | 16.69 | 8.75 | −1.96 | −8.05 |
| 4 | 20 | 14.66 | 3.20 | 0.17 | −1.61 |

LENS ELEMENT DATA

| ELEMENT | FIRST SURFACE | FOCAL LENGTH |
|---|---|---|
| 1 | 1 | −33.75 |
| 2 | 2 | 124.13 |
| 3 | 3 | 30.48 |
| 4 | 5 | 40.63 |
| 5 | 7 | −7.45 |
| 6 | 9 | −11.26 |
| 7 | 11 | 16.57 |
| 8 | 13 | 12.20 |
| 9 | 16 | −11.69 |
| 10 | 18 | 20.17 |
| 11 | 20 | 7.96 |
| 12 | 21 | −16.22 |

Numerical Example 10

Embodiment 10

| SURFACE NO. | R | D | Nd | vd | EFFECTIVE DIAMETER |
|---|---|---|---|---|---|
| 1 | 47.799 | 1.00 | 1.84666 | 23.9 | 21.99 |
| 2 | 19.070 | 1.25 | 2.00272 | 19.3 | 20.99 |
| 3 | 20.905 | 4.55 | 1.60311 | 60.6 | 20.65 |
| 4 | −179.125 | 0.74 | | | 20.27 |
| 5 | 19.130 | 2.63 | 1.67790 | 55.3 | 18.61 |
| 6 | 51.819 | (VARIABLE) | | | 17.90 |
| 7 | 53.909 | 0.98 | 1.88300 | 40.8 | 10.20 |
| 8 | 5.908 | 2.79 | | | 7.87 |
| 9 | −22.610 | 0.55 | 1.71300 | 53.9 | 7.36 |
| 10 | 13.977 | 0.58 | | | 7.17 |
| 11 | 11.660 | 1.25 | 1.92286 | 18.9 | 7.26 |
| 12 | 50.440 | (VARIABLE) | | | 7.07 |
| 13 (STOP) | ∞ | 0.20 | | | 8.02 |
| 14* | 8.384 | 2.48 | 1.58313 | 59.4 | 8.33 |
| 15 | −30.079 | 3.11 | | | 8.10 |
| 16 | 71.298 | 0.70 | 1.76182 | 26.5 | 6.40 |
| 17 | 7.397 | 0.47 | | | 6.00 |
| 18* | 17.020 | 1.17 | 1.58313 | 59.4 | 6.01 |
| 19 | −57.988 | (VARIABLE) | | | 6.20 |
| 20 | 11.977 | 2.45 | 1.81600 | 46.6 | 8.40 |
| 21 | −10.604 | 0.54 | 1.84666 | 23.9 | 8.27 |
| 22 | −70.342 | (VARIABLE) | | | 8.09 |
| IMAGE PLANE | ∞ | | | | |

ASPHERICAL SURFACE DATA

SURFACE 14

κ = 5.31511e−001      A4 = −3.63257e−004
A6 = −2.46278e−006    A8 = −1.23522e−007

SURFACE 18

κ = −1.73310e+000     A4 = 5.40779e−005
A6 = −3.93933e−006    A8 = 3.97294e−007

VARIOUS DATA
ZOOM RATIO 11.83

| | WIDE-ANGLE | | MIDDLE | | TELEPHOTO | |
|---|---|---|---|---|---|---|
| | INFINITY | x0.186 | INFINITY | x0.10 | INFINITY | x0.10 |
| FOCAL LENGTH | 4.92 | 4.92 | 22.91 | 22.91 | 58.21 | 58.21 |
| FNO | 1.85 | 1.89 | 2.70 | 2.88 | 3.00 | 2.76 |
| ANGLE OF VIEW | 28.22 | 28.22 | 6.57 | 6.57 | 2.60 | 2.60 |
| IMAGE HEIGHT | 2.64 | 2.64 | 2.64 | 2.64 | 2.64 | 2.64 |
| LENS LENGTH | 60.09 | 60.09 | 60.09 | 60.09 | 60.09 | 60.09 |
| BF | 7.55 | 8.48 | 10.01 | 12.29 | 4.54 | 10.63 |
| D6 | 0.70 | 0.70 | 14.29 | 14.29 | 18.58 | 18.58 |
| D12 | 18.59 | 18.59 | 5.00 | 5.00 | 0.71 | 0.71 |
| D19 | 5.81 | 4.89 | 3.36 | 1.07 | 8.83 | 2.74 |
| D22 | 7.55 | 8.48 | 10.01 | 12.29 | 4.54 | 10.63 |

LENS UNIT DATA

| UNIT | FIRST SURFACE | FOCAL LENGTH | LENS UNIT LENGTH | FRONT PRINCIPAL POINT | REAR PRINCIPAL POINT |
|---|---|---|---|---|---|
| 1 | 1 | 30.81 | 10.16 | 2.64 | −3.78 |
| 2 | 7 | −6.52 | 6.16 | 0.74 | −4.17 |
| 3 | 13 | 17.21 | 8.12 | −2.76 | −8.10 |
| 4 | 20 | 13.12 | 2.99 | 0.21 | −1.46 |

| LENS ELEMENT DATA | | |
| --- | --- | --- |
| ELEMENT | FIRST SURFACE | FOCAL LENGTH |
| 1 | 1 | −38.08 |
| 2 | 2 | 161.48 |
| 3 | 3 | 31.31 |
| 4 | 5 | 43.33 |
| 5 | 7 | −7.59 |
| 6 | 9 | −12.04 |
| 7 | 11 | 16.18 |
| 8 | 14 | 11.52 |
| 9 | 16 | −10.88 |
| 10 | 18 | 22.69 |
| 11 | 20 | 7.25 |
| 12 | 21 | −14.81 |

The numerical values of the conditions (1) to (12) of each numerical example (each embodiment) are shown in Table 1.

TABLE 1

| | Lower Limit | Upper Limit | | Numerical Example | | | |
| --- | --- | --- | --- | --- | --- | --- | --- |
| | | | | 1 | 2 | 3 | 4 |
| Condition (1) | 0.00 | | φGH | 0.00807 | 0.00688 | 0.00728 | 0.00700 |
| Condition (2) | | 39.50 | vdGH | 23.80 | 18.90 | 25.40 | 22.80 |
| Condition (3) | 1.70 | | ndGH | 1.8467 | 1.9229 | 1.8052 | 1.8081 |
| Condition (4) | 0.65 | 6.00 | |φ2/φ1| | 1.46 | 1.57 | 1.44 | 1.41 |
| Condition (5) | 0.45 | 4.00 | |ΣφGH × φ2/φ1$^2$| | 0.86 | 0.85 | 0.85 | 0.72 |
| | | | βmax | 1.00 | 1.00 | 1.00 | 1.00 |
| Condition (6) | 0.15 | 3.00 | ΣφGH/φ1 | 0.59 | 0.55 | 0.59 | 0.51 |
| Condition (7) | 0.28 | 3.00 | |ΣφGH/φ1/βmax| | 0.59 | 0.55 | 0.59 | 0.51 |
| Condition (8) | 0.75 | 4.00 | |ΣφGN/φ1| | 2.02 | 2.09 | 2.28 | 1.91 |
| Condition (9) | 0.15 | 2.50 | |ΣφGL + ΣφGH|/φ1 | 1.31 | 0.55 | 1.38 | 1.21 |
| Condition (10) | 0.58 | 0.90 | θgFGH | 0.621 | 0.650 | 0.616 | 0.631 |
| Condition (11) | 0.50 | 1.60 | |vdGHmin/vdGNmin| | 0.796 | 0.659 | 0.849 | 0.763 |
| Condition (12) | 0.75 | 4.00 | f/f1 | 2.472 | 2.273 | 2.227 | 2.062 |

| | Lower Limit | Upper Limit | | Numerical Example | | |
| --- | --- | --- | --- | --- | --- | --- |
| | | | | 5 | 6 | 7 |
| Condition (1) | 0.00 | | φGH | 0.00576 | 0.00612 | 0.00661 |
| Condition (2) | | 39.50 | vdGH | 32.30 | 35.30 | 29.50 |
| Condition (3) | 1.70 | | ndGH | 1.8503 | 1.7495 | 1.7174 |
| Condition (4) | 0.65 | 6.00 | |φ2/φ1| | 1.38 | 1.32 | 1.30 |
| Condition (5) | 0.45 | 4.00 | |ΣφGH × φ2/φ1$^2$| | 0.57 | 0.58 | 0.62 |
| | | | βmax | 1.00 | 1.00 | 1.00 |
| Condition (6) | 0.15 | 3.00 | ΣφGH/φ1 | 0.41 | 0.44 | 0.48 |
| Condition (7) | 0.28 | 3.00 | |ΣφGH/φ1/βmax| | 0.41 | 0.44 | 0.48 |
| Condition (8) | 0.75 | 4.00 | |ΣφGN/φ1| | 1.71 | 1.79 | 1.86 |
| Condition (9) | 0.15 | 2.50 | |ΣφGL + ΣφGH|/φ1 | 1.11 | 1.16 | 1.21 |
| Condition (10) | 0.58 | 0.90 | θgFGH | 0.593 | 0.587 | 0.605 |
| Condition (11) | 0.50 | 1.60 | |vdGHmin/vdGNmin| | 0.970 | 1.009 | 0.843 |
| Condition (12) | 0.75 | 4.00 | f/f1 | 1.874 | 1.874 | 1.876 |

| | Lower Limit | Upper Limit | | Numerical Example | | |
| --- | --- | --- | --- | --- | --- | --- |
| | | | | 8 | 9 | 10 |
| Condition (1) | 0.00 | | φGH | 0.01254 | 0.00023 | 0.00806 | 0.00619 |
| Condition (2) | | 39.50 | vdGH | 23.80 | 23.80 | 18.90 | 19.30 |
| Condition (3) | 1.70 | | ndGH | 1.8467 | 1.8467 | 1.9229 | 2.0027 |
| Condition (4) | 0.65 | 6.00 | |φ2/φ1| | 0.75 | 4.74 | 4.73 |
| Condition (5) | 0.45 | 4.00 | |ΣφGH × φ2/φ1$^2$| | 0.66 | 1.15 | 0.90 |
| | | | βmax | 1.00 | 0.19 | 0.17 |
| Condition (6) | 0.15 | 3.00 | ΣφGH/φ1 | 0.87 | 0.24 | 0.19 |
| Condition (7) | 0.28 | 3.00 | |ΣφGH/φ1/βmax| | 0.87 | 1.30 | 1.10 |
| Condition (8) | 0.75 | 4.00 | |ΣφGN/φ1| | 3.16 | 0.89 | 0.81 |
| Condition (9) | 0.15 | 2.50 | |ΣφGL + ΣφGH|/φ1 | 0.87 | 0.24 | 0.19 |
| Condition (10) | 0.58 | 0.90 | θgFGH | 0.621 | 0.621 | 0.650 | 0.645 |
| Condition (11) | 0.50 | 1.60 | |vdGHmin/vdGNmin| | 1.000 | 0.791 | 0.808 |
| Condition (12) | 0.75 | 4.00 | f/f1 | 0.951 | 1.935 | 1.889 |

[Embodiment 11]

Description will be made of a digital still camera (optical apparatus) using the optical system described in each of the above embodiments as an image taking optical system with reference to FIG. 21. The digital still camera is an eleventh embodiment (Embodiment 11) of the present invention.

Figure 21:
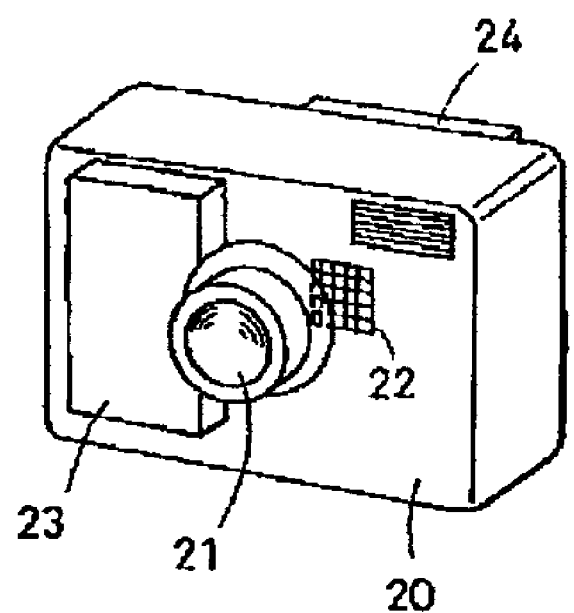
FIG. 21 is shows an image pickup apparatus of Embodiment 11 of the present invention.

In FIG. 21, reference numeral 20 denotes a camera body. Reference numeral 21 denotes the image taking optical system constituted by the optical system described in any one of Embodiments 1 to 10. Reference numeral 22 denotes a solid-state image-pickup element (photoelectric conversion element) such as a CCD sensor or a CMOS sensor which is provide inside the camera body 20 and receives an object image formed by the image taking optical system 21.

Reference numeral 23 denotes a memory that records image information corresponding to the object image photoelectrically converted by the solid-state image-pickup element 22. Reference numeral 24 denotes an electric viewfinder that is constituted by a liquid crystal display panel or the like and causes a user to observe the image information generated through the solid-state image pickup element 22.

Using the optical system described in any one of Embodiments 1 to 10 as the image taking optical system of the optical apparatus such as the digital still camera, a video camera or an interchangeable lens as described above enables good correction of the variation of the various aberrations with the zooming or the focusing, which makes it possible to achieve an optical apparatus capable of generating a high-quality captured image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-031477, filed on Feb. 16, 2010, and Japanese Patent Application No. 2011-19771, filed on Feb. 1, 2011, which are hereby incorporated by reference herein in their entirety.

What is claimed is:

1. An optical system comprising:
a first lens unit and a second lens unit that are arranged in order from an object side to an image side, the first lens unit having a positive refractive power and the second lens unit having a negative refractive power; and
an aperture stop disposed further on the image side than the second lens unit,
wherein during focusing, the first lens unit is not moved with respect to an image plane in an optical axis direction and the second lens unit is moved with respect to the image plane in the optical axis direction,
wherein none of lenses included in the first lens unit are moved with respect to each other during the focusing, and
wherein the first lens unit includes at least one first optical element satisfying the following conditions:

$\phi GH > 0.0;$ $vdGH < 39.5;$ and $ndGH > 1.70,$ and wherein the optical system satisfies the following conditions:

$\beta max > 0.5;$ $0.65 < |\phi 2/\phi 1| < 1.8;$ $0.45 < |\Sigma \phi GH \times \phi 2/\phi 1^2| < 4.00;$ and $0.28 < |\Sigma \phi GH/\phi 1/\beta max| < 3.0,$ where $\phi GH$ represents a refractive power of the first optical element when a light-entrance surface and a light-exit surface of the first optical element are in contact with air, vdGH and ndGH respectively represent an Abbe number and a refractive index of a material forming the first optical element for a d-line, $\beta max$ represents a maximum image-forming magnification of the optical system, $\phi 1$ and $\phi 2$ respectively represent the refractive powers of the first lens unit and the second lens unit, and $\Sigma \phi GH$ represents a sum total of the refractive power $\phi GH$ of the at least one first optical element.

2. An optical system according to claim 1, wherein the optical system satisfies the following condition:

$0.15 < \Sigma \phi GH/\phi 1 < 3.0.$

3. An optical system according to claim 1, wherein:
the first lens unit includes at least one negative optical element having a negative refractive power, and
the optical system satisfies the following condition:

$0.75 < |\Sigma \phi GN/\phi 1| < 4.00,$ where $\Sigma \phi GN$ is a sum total of the negative refractive power $\phi GN$ of the at least one negative optical element.

4. An optical system according to claim 1, wherein:
the first lens unit includes at least one positive optical element having a positive refractive power, and the at least one positive optical element includes at least one optical element formed by a material whose Abbe number vd for the d-line is larger than 70.5, and
the optical system satisfies the following condition:

$0.15 < (\Sigma \phi GL + \Sigma \phi GH)/\phi 1 < 2.5$ where $\Sigma \phi GL$ represents a sum total of the positive refractive power $\phi GL$ of the at least one optical element whose Abbe number vd for the d-line is larger than 70.5.

5. An optical system according to claim 1, wherein the optical system satisfies the following condition:

$0.58 < \theta gFGH < 0.90,$ where $\theta gFGH$ represents a partial dispersion ratio of the material forming the first optical element for a g-line and an F-line.

6. An optical system according to claim 1, wherein:
the first lens unit includes at least one positive optical element having a positive refractive power and at least one negative optical element having a negative refractive power, and
the optical system satisfies the following condition:

$0.50 < |vdGPmin/vdGNmin| < 1.60,$ where vdGPmin represents an Abbe number of a first material for the d-line, and vdGNmin represents an Abbe number of a second material for the d-line, the first material being a material whose Abbe number is minimum in at least one material forming the at least one positive optical element, and the second material being a material whose Abbe number is minimum in at least one material forming the at least one negative optical element.

7. An optical system according to claim 1, wherein the optical system satisfies the following condition:

$$0.75 < f/f1 < 4.00,$$

where f1 represents a focal length of the first lens unit, and f represents a focal length of the optical system.

8. An optical system according to claim 1, wherein:
the optical system is a zoom lens in which the distance between the first and second lens units increases with variation of magnification, and
the optical system satisfies the following condition:

$$0.75 < ft/f1 < 4.00,$$

where ft represents a focal length of the optical system at a telephoto end.

9. An optical apparatus comprising:
an image pickup element; and
an optical system comprising:
a first lens unit and a second lens unit that are arranged in order from an object side to an image side, the first lens unit having a positive refractive power and the second lens unit having a negative refractive power; and
an aperture stop disposed further on the image side than the second lens unit,
wherein during focusing, the first lens unit is not moved with respect to an image plane in an optical axis direction and the second lens unit is moved with respect to the image plane in the optical axis direction,
wherein none of lenses included in the first lens unit are moved with respect to each other during the focusing, and
wherein the first lens unit includes at least one first optical element satisfying the following conditions:

$$\phi GH > 0.0$$

$$vdGH < 39.5; \text{ and}$$

$$ndGH > 1.70, \text{ and}$$

wherein the optical system satisfies the following conditions:

$$\beta max > 0.5;$$

$$0.65 < |\phi 2/\phi 1| < 1.8;$$

$$0.45 < |\Sigma \phi GH \times \phi 2/\phi 1^2| < 4.00; \text{ and}$$

$$0.28 < |\Sigma \phi GH/\phi 1/\beta max| < 3.0,$$

where $\phi GH$ represents a refractive power of the first optical element when a light-entrance surface and a light-exit surface of the first optical element are in contact with air, vdGH and ndGH respectively represent an Abbe number and a refractive index of a material forming the first optical element for a d-line, $\beta max$ represents a maximum image-forming magnification of the optical system, $\phi 1$ and $\phi 2$ respectively represent the refractive powers of the first lens unit and the second lens unit, and $\Sigma \phi GH$ represents a sum total of the refractive power $\phi GH$ of the at least one first optical element.

10. An optical system comprising:
a first lens unity and a second lens unit that are arranged in order from an object side to an image side, the first lens unit having a positive refractive power and the second lens unit having a negative refractive power; and
an aperture stop disposed further on the image side than the second lens unit,
wherein during focusing, the first lens unit is not moved with respect to an image plane in an optical axis direction and the second lens unit is moved with respect to the image plane in the optical axis direction,
wherein none of lenses included in the first lens unit are moved with respect to each other during the focusing, and
wherein the first lens unit includes at least one first optical element satisfying the following conditions:

$$\phi GH > 0.0;$$

$$vdGH < 39.5; \text{ and}$$

$$ndGH > 1.70, \text{ and}$$

wherein the optical system satisfies the following conditions:

$$0.65 < |\phi 2/\phi 1| < 6.00;$$

$$0.45 < |\Sigma \phi GH \times \phi 2/\phi 1^2| < 4.00; \text{ and}$$

$$0.28 < |\Sigma \phi GH/\phi 1/\beta max| < 3.0,$$

where $\phi GH$ represents a refractive power of the first optical element when a light-entrance surface and a light-exit surface of the first optical element are in contact with air, vdGH and ndGH respectively represent an Abbe number and a refractive index of a material forming the first optical element for a d-line, $\phi 1$ and $\phi 2$ respectively represent the refractive powers of the first lens unit and the second lens unit, $\Sigma \phi GH$ represents a sum total of the refractive power $\phi GH$ of the at least one first optical element, and $\beta max$ represents a maximum image-forming magnification of the optical system.

11. An optical apparatus comprising:
an image pickup element; and
an optical system comprising:
a first lens unit and a second lens unit that are arranged in order from an object side to an image side, the first lens unit having a positive refractive power and the second lens unit having a negative refractive power; and
an aperture stop disposed further on the image side than the second lens unit,
wherein during focusing, the first lens unit is not moved with respect to an image plane in an optical axis direction and the second lens unit is moved with respect to the image plane in the optical axis direction,
wherein none of lenses included in the first lens unit are moved with respect to each other during the focusing, and
wherein the first lens unit includes at least one first optical element satisfying the following conditions:

$$\phi GH > 0.0;$$

$$vdGH < 39.5; \text{ and}$$

$$ndGH > 1.70, \text{ and}$$

wherein the optical system satisfies the following conditions:

$$0.65 < |\phi 2/\phi 1| < 6.00;$$

$$0.45 < |\Sigma \phi GH \times \phi 2/\phi 1^2| < 4.00; \text{ and}$$

$$0.28 < |\Sigma \phi GH/\phi 1/\beta max| < 3.0,$$

where $\phi GH$ represents a refractive power of the first optical element when a light-entrance surface and a light-exit surface of the first optical element are in contact with air, vdGH and ndGH respectively represent an Abbe number and a refractive index of a material forming the first optical element for a d-line, $\phi 1$ and $\phi 2$ respectively represents the refractive powers of the first lens unit and the second lens unit, $\Sigma \phi GH$ represents a sum total of the refractive power $\phi GH$ of the at least one first optical element, and $\beta max$ represents a maximum image-forming magnification of the optical system.

* * * * *